United States Patent
Baxley et al.

(10) Patent No.: US 10,338,191 B2
(45) Date of Patent: Jul. 2, 2019

(54) SENSOR MESH AND SIGNAL TRANSMISSION ARCHITECTURES FOR ELECTROMAGNETIC SIGNATURE ANALYSIS

(71) Applicant: Bastille Networks, Inc., Atlanta, GA (US)

(72) Inventors: Robert John Baxley, Atlanta, GA (US); David Maynor, Atlanta, GA (US); Christopher Jay Rouland, Atlanta, GA (US); Michael Thomas Engle, Holmdel, NJ (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

(21) Appl. No.: 14/617,798

(22) Filed: Feb. 9, 2015

(65) Prior Publication Data

US 2016/0127403 A1 May 5, 2016

Related U.S. Application Data

(60) Provisional application No. 62/072,884, filed on Oct. 30, 2014.

(51) Int. Cl.
*H04L 29/06* (2006.01)
*G01S 5/02* (2010.01)
(Continued)

(52) U.S. Cl.
CPC .............. *G01S 5/0263* (2013.01); *G01S 5/02* (2013.01); *G01S 5/0242* (2013.01);
(Continued)

(58) Field of Classification Search
CPC .. H04L 63/1425; H04W 4/005; H04W 12/10; H04W 84/18
(Continued)

(56) References Cited

U.S. PATENT DOCUMENTS

| 9,386,463 | B1* | 7/2016 | Contino | ................ H04W 24/02 |
| 2006/0168205 | A1* | 7/2006 | Barron | ................... H04L 41/12 |
| | | | | 709/224 |

(Continued)

*Primary Examiner* — Matthew T Henning
(74) *Attorney, Agent, or Firm* — Long Technology Law, LLC; Joseph L. Long

(57) ABSTRACT

Systems and methods can support a sensor mesh and signal transmission architecture for electromagnetic signature analysis and threat detection. Sensor antennas may be deployed within an electromagnetic environment. A configurable antenna feed network can couple radio frequency signals from the antennas to both software-defined radio receivers and hardware-defined radio receivers. A raw signal analysis engine associated with the software-defined radio receiver can receive digital samples of the radio frequency signals, identify signal features within the digital samples, and generate signal feature vectors from the identified signal features. A signal feature network can receive the signal feature. A signal aggregation and analysis engine can receive the signal feature vectors from the signal feature network, aggregate the signal feature vectors, process the signal feature vectors, and identify wireless attacks according to the signal features within the signal feature vectors. One or more updatable analysis databases can support the signal processing operations.

20 Claims, 8 Drawing Sheets

(51) Int. Cl.

| | | |
|---|---|---|
| *G06K 9/00* | (2006.01) | |
| *G06T 7/20* | (2017.01) | |
| *H04N 5/265* | (2006.01) | |
| *G06T 7/60* | (2017.01) | |
| *G06K 9/52* | (2006.01) | |
| *G06F 16/28* | (2019.01) | |
| *G06F 16/951* | (2019.01) | |
| *H04W 12/10* | (2009.01) | |
| *H04B 1/18* | (2006.01) | |
| *H04W 4/021* | (2018.01) | |
| *H04W 12/08* | (2009.01) | |
| *H04B 17/10* | (2015.01) | |
| *H04B 17/391* | (2015.01) | |
| *H04W 24/08* | (2009.01) | |
| *H04W 12/12* | (2009.01) | |
| *H04K 3/00* | (2006.01) | |
| *H04W 4/70* | (2018.01) | |
| *H04W 84/18* | (2009.01) | |
| *G08B 13/00* | (2006.01) | |

(52) U.S. Cl.
CPC .......... *G06F 16/285* (2019.01); *G06F 16/951* (2019.01); *G06K 9/00718* (2013.01); *G06K 9/00744* (2013.01); *G06K 9/00771* (2013.01); *G06K 9/52* (2013.01); *G06T 7/20* (2013.01); *G06T 7/60* (2013.01); *H04B 1/18* (2013.01); *H04B 17/10* (2015.01); *H04B 17/391* (2015.01); *H04K 3/22* (2013.01); *H04L 63/1416* (2013.01); *H04L 63/1425* (2013.01); *H04N 5/265* (2013.01); *H04W 4/021* (2013.01); *H04W 4/70* (2018.02); *H04W 12/08* (2013.01); *H04W 12/10* (2013.01); *H04W 12/12* (2013.01); *H04W 24/08* (2013.01); *G06K 2209/27* (2013.01); *G08B 13/00* (2013.01); *H04K 2203/18* (2013.01); *H04L 63/302* (2013.01); *H04W 84/18* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 2007/0025265 | A1* | 2/2007 | Porras | G06K 7/0008 370/252 |
| 2007/0277242 | A1* | 11/2007 | Baker | G06F 21/554 726/25 |
| 2009/0156129 | A1* | 6/2009 | Hassan | G06F 9/5044 455/66.1 |
| 2011/0122788 | A1* | 5/2011 | Sombrutzki | H04W 16/10 370/252 |
| 2013/0051250 | A1* | 2/2013 | Shaffer | H04L 45/22 370/252 |
| 2014/0269704 | A1* | 9/2014 | Alexander | H04W 4/06 370/390 |
| 2015/0350914 | A1* | 12/2015 | Baxley | H04W 12/08 726/11 |

* cited by examiner

SENSOR MESH AND SIGNAL TRANSMISSION ARCHITECTURES FOR ELECTROMAGNETIC SIGNATURE ANALYSIS

RELATED APPLICATION

This application claims priority to U.S. Provisional Patent Application No. 62/072,884, filed Oct. 30, 2014 and entitled "Systems and Methods for Identifying Wireless Security Threats Via Electromagnetic Signatures of the Internet of Things." The complete disclosure of the above-identified priority application is hereby fully incorporated herein by reference.

BACKGROUND

There are billions of electronically communicating devices in use. Many of these devices are wireless devices such as smartphones, tablets, personal computers (PCs), media players and readers, personal digital assistants (PDAs), headsets, cameras, vehicles, wearable fitness device, health monitoring devices, and so forth. Many of these devices use some form of electromagnetic (EM) or radio frequency (RF) technology for communications with other devices, various communications services, and the Internet. Many of these devices wirelessly connect to the Internet forming a growing "Internet of Things" (IoT). The number of electronically communicating devices is expected continue to multiply due to business and consumer demands.

Despite the growing ubiquity of IoT devices, these devices and the networks connecting them remain vulnerable to wireless attacks. One driver in IoT device vulnerability is that there is no dominant IoT wireless networking standard. Instead, IoT devices employ one of many wireless access protocols. Some of these protocols are openly defined for anyone to use, others are proprietary to specific manufacturers. Because of this heterogeneity, IoT networks have been constructed with a primary objective of efficiently implementing stable wireless connectivity and generally assume that the wireless operating environment will be absent of threats from malicious agents. As speed and stability have been primary concerns, there has been little attention focused on the security of IoT wireless networks and their components. This reliance on implicit trust leaves wireless networks and the connected nodes vulnerable to external attacks.

IoT wireless protocols define how nodes operate on the network and may provide a gateway for entry to existing wired networks. Malicious agents may exploit these protocols to gain network access and possibly engage in undesirable network activities. Ill-defined protocols or misconfigured configured network nodes can cause harm either unintentionally due to poor user operation or intentionally by allowing access to malicious agents.

An example malicious objective may be to degrade the target network performance, or ultimately deny service to legitimate users. Another example may be to extract situational awareness about the target network. Yet another example may be to extract sensitive information from the target network. Other goals of malicious actors may include impacting network routing to prevent certain packets from reaching their intended destination or acting as an authenticated node by evading network trust mechanisms.

Emerging adaptable link layer protocols, such cognitive radio, may impact both attack and defense paradigms. Highly agile medium access, which may adapt due to context or environment, may result in wireless network nodes that are even more susceptible to attacks that exploit unforeseen vulnerabilities. Under this emerging paradigm, spatial dynamics may play a large role in how the network forms and operates.

There is a need in the art for architectures to detect, locate, and classifying wireless attacks against IoT networks and devices. Such architectures can support the implementation of security measures related to collecting and processing electromagnetic, radio frequency emission signatures from electronic devices for identifying potential wireless network security threats.

SUMMARY

In certain example embodiments described herein, methods and systems can support a sensor mesh and signal transmission architecture for electromagnetic signature analysis and threat detection. A plurality of sensor antennas may be deployed within an electromagnetic environment. A configurable antenna feed network can couple radio frequency signals from the sensor antennas to both software-defined radio receivers and hardware-defined radio receivers. A raw signal analysis engine associated with the software-defined radio receiver can receive digital samples of the radio frequency signals, identify signal features within the digital samples, and generate signal feature vectors from the identified signal features. A signal feature network can receive the signal feature vectors generated by the raw signal analysis engine. A signal aggregation and analysis engine can receive the signal feature vectors from the signal feature network, aggregate the signal feature vectors, process the signal feature vectors to refine the signal features within the signal feature vectors, and identify wireless attacks according to the signal features within the signal feature vectors. One or more updatable analysis databases can support operations of the raw signal analysis engine and the signal aggregation and analysis engine.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable architectures for detecting, locating, and classifying wireless attacks against IoT networks and devices. A network of sensors can collect radio frequency signals. A network of signal processing engines can process those collected signals to identify, geolocate, group, determine intent of, and classify wireless devices in the area. Databases can manage and leverage libraries of signal and attack information. Security administrators may use a visualization console to monitor for wireless security threats. Technology presented herein can implement security measures related to the use of detected electromagnetic, radio frequency emission signatures from electronic devices to detect potential security threats.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
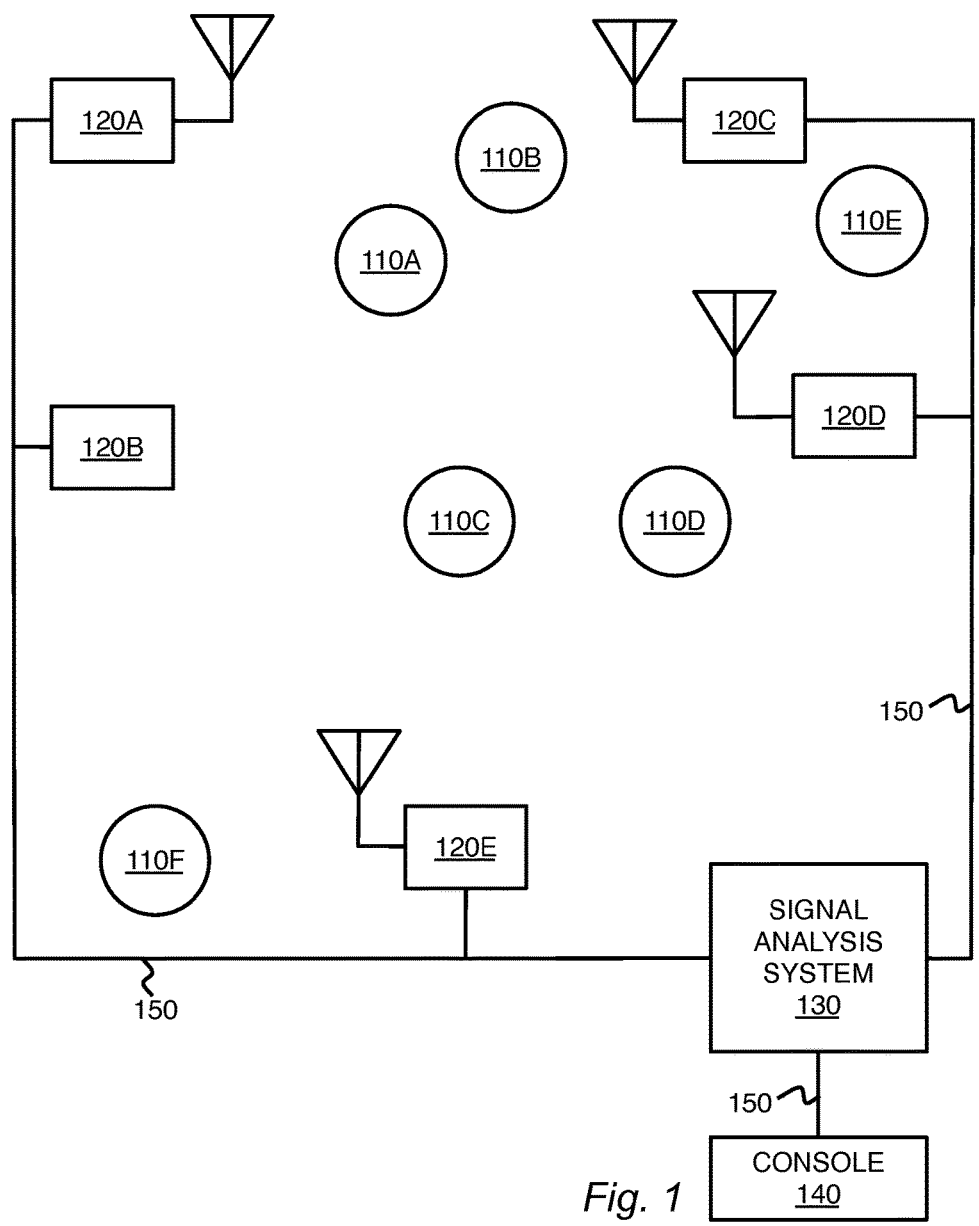
FIG. 1 is a block diagram depicting an electromagnetic environment and signature analysis system in accordance with one or more embodiments presented herein.

FIG. 1 is a block diagram depicting an electromagnetic environment and signature analysis system in accordance with one or more embodiments presented herein. Wireless devices 110A-110F may each engage in one or more modes of radio communication thereby generating electromagnetic signals. The technology presented herein can collect and analyze these signals. Sensors 120A-120E can collect and report radio frequency signals within the surrounding electromagnetic environment. A signal analysis system 130 can process the collected radio frequency signals. A console 140 can provide a user interface for configuring, controlling, or reviewing analysis results associated with the signal analysis system 130. One or more networks 150 may interconnect some or all of the sensors 120, the signal analysis system 130, and the console 140.

The wireless devices 110A-110F may be referred to, in general or collectively, as wireless devices 110 or a wireless device 110. The wireless devices 110 may include smartphones, computers, wearable devices, embedded computing devices, building system devices, industrial control/automation systems, physical security systems, security monitoring devices, automotive systems, avionics, point of sales systems, customer tracking systems, inventory systems, wireless data/voice/video infrastructure, access control systems, and so forth. The wireless devices 110 may use wireless technologies such as wireless local area networks, short range wireless communications, mobile/cellular communications, satellite communications, or various other wireless communication technologies. These communication technologies may employ standards known as WI-FI, BLUETOOTH, ZIGBEE, GSM, CDMA, LTE, among others.

The sensors 120A-120E may be referred to, in general or collectively, as sensors 120 or a sensor 120. The sensors 120 may collect electromagnetic signals from one or more antennas over a wide bandwidth of radio frequencies. The sensors 120 may utilize hardware radio receivers or software-defined radio frequency receivers. According to various embodiments, these radio receivers can convert received radio frequency energy into digital signals. These digital signals can then be decoded into encoded data streams.

While hardware-defined radio receivers can be cost-effective and less complex to implement, they may be limited as to what type of encoded data streams they can detect from the electromagnetic environment. For example, a hardware Wi-Fi receiver module or chipset is generally not able to also receive mobile telephone radio signals. In contrast, software-defined radio receivers can much more flexibly receive and decode various data streams within the electromagnetic environment under software control. The signal data collected by the sensors 120 may be transmitted to the signal analysis system 130 for processing. These signals or related signal data may be communicated in a continuous fashion or in one or more batches, at particular intervals according to various embodiments.

The signal analysis system 130 can receive and process signals from the sensors 120. The signal analysis system 130 may perform, among other functions, raw signal analysis, signal aggregation, multiple-input antenna processing, space-time-frequency analysis, geolocation, link pair association, throughput estimation, classification, attack analysis, and various other types of signal processing and analysis. The signal analysis system 130 may comprise a signal aggregation and analysis engine comprised of one or more feature vector processors. The signal analysis system 130 may be comprised of multiple systems that perform different portions of analysis and pass signals between each other in various formats over various communication links of the networks 150. For example, the signal analysis system 130 may comprise a complex and flexible network of various processing devices, which may be distributed to certain degrees or layered in a hierarchical system, to analyze and process the signals from the sensors 120.

The console 140 and various associated operator interfaces can support configuring, controlling, or reviewing analysis results associated with the signal analysis system 130. The console 140 can provide visualization features for use by security administrators to monitor the electromagnetic environment for wireless security threats. Such visualizations may include displays about the area under surveillance including device type, device position, pair-wise wireless communication links between devices, estimates of the data throughput being transmitted by devices, attack types being perpetrated, victim devices, and so forth. The operator interfaces may comprise interfaces associated with one or more visualization consoles 140, one or more administrative user interface application, or various other user or system interfaces associated with the technology presented herein.

The networks 150 may interconnect some or all of the sensors 120, the signal analysis system 130, and the console 140. Portions of the networks 150 connecting the sensors may be configured to transmit radio frequency signals and/or digital information. Radio frequency signals may be communicated as collected, down-converted using an intermediate frequency oscillator, or down-converted to baseband. Communication links associated with the networks 150 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 150 may use wireless frequencies or transmission paths that are selected to avoid interference from or to the electromagnetic environment in use by the wireless devices 110.

It should be appreciated that, according to certain embodiments, the wireless devices 110 may also make use of the networks 150. According to certain other embodiments, the wireless devices 110 may be dissuaded or precluded from sharing the networks 150 with the signal collection and analysis systems presented herein and instead may connect to one or more production networks that are separate from the networks 150 associated with the sensors 120 and/or the signal analysis system 130.

The sensors 120, or the antennas associated therewith, may be physically distributed around an area under surveillance. The collective coverage provided by the sensors 120 may define the effective extent of the area under surveillance. According to some examples, the sensors 120 may be positioned uniformly on a grid pattern throughout the area under surveillance. The grid may be a square grid, hexagonal grid, or other distributed pattern. The spatial period of the distribution pattern may be related to a coverage distance associated with each sensor 120. The periodic positioning of the sensors 120 may be altered to accommodate structures within the environment such as walls, stairwells, mechanical systems, and so forth. The periodic positioning of the sensors 120 may be altered to accommodate infrastructure feeds such as power and interface points for the network 150. For example, the interface points for the network 150 might be Ethernet ports.

Designing a location plan for the sensors 120 may start by receiving a floor plan of the proposed area under surveillance. Locations for available power and interface points for the network 150 may be identified. Sensor locations may be selected to form an approximately uniform grid, or other spatial distribution, constrained to the identified infrastructure locations. The sensors 120 may then be deployed at these locations. Once the sensors 120 are collecting signals, the number of packets, or other identified signal features, may be tracked such that sensors 120 collecting low numbers may be evaluated as potentially coving low traffic areas. Such low traffic sensors 120 may be re-position or spaced out to improve aggregate reception efficiency. Designing a location plan for the sensors 120 in this fashion may be referred to as surveillance area survey planning.

Other example sensor survey mechanisms may involve calculating the expected performance of a given sensor layout using physics-based or statistics-based models. For example, a physics-based model may calculate link budgets from points within the area under surveillance to each sensor 120. From these link budgets it may be possible to characterize how many sensors 120 would be able to see a given point in the area under surveillance on average. According to other examples, statistics-based site surveys may involve modeling the distribution of received signal strength values for each various pairings of a sensor 120 to a point in space within the area under surveillance. Statistical estimation techniques, such as the Cramer-Rao bound, may be used to establish a sensor location plan from the modeled signal strength values. For example, a bound may be determined for the base-case localization error over selected points within the area under surveillance.

One example attack type that may occur within the electromagnetic environment can involve a wireless device 110 configured as a malicious agent. The malicious agent may be configured as a rogue wireless access point to target other wireless devices 110 as victims. The rogue wireless access point may provide an unapproved wireless local area network, such as a Wi-Fi network. According to certain examples, legitimate users of wireless devices 110 may scan for available wireless networks and find the rogue network that has been intentionally named to appear as a trustworthy wireless network within the organization. In some instances, one or more of the wireless device 110 may automatically, or manually, connect to the malicious Wi-Fi network after assuming it to be trustworthy. Once connected, the malicious agents may attempt to obtain passwords, bank account details, employment records, or other types of sensitive information from the victim wireless device 110. Also, the malicious agents may add malicious code the victim wireless device 110 allowing further malicious actions against the victim, other victims, or the network in general.

Application of an electromagnetic signal collection and analysis system as presented herein can provide an area of enhanced wireless security against such malicious agents. With respect to the rogue wireless access point example attack, the signal analysis system 130 may be configured to parse the malicious Wi-Fi signal and determine that the malicious device is broadcasting a Wi-Fi signal to create an unauthorized wireless network. The signal analysis system 130 can send a notification to an appropriate security system or appropriate personnel. The notification may be made via the console 140 and may include an estimated location for the malicious device.

It should be appreciated that wireless security threats may take many different forms such as viruses, malware, spyware, and so forth. The threats may be transmitted through a variety of different channels, such as different frequencies, protocols, or wireless services. The threats may be designed to accomplish a variety of nefarious tasks such as shutting systems down, stealing information, denial of service attacks, device spoofing, and so forth.

The technology presented herein may support detecting and classifying wireless attacks on wireless devices 110 and networks. The technology presented herein may also support geolocating rogue, unauthorized, or malicious wireless devices 110. The technology presented herein may also support identifying data transfer event and estimating the amount of data being transmitted from a wireless device 110 using time-frequency physical-layer measurements of the electromagnetic environment. The technology presented herein may also support classifying the modes of wireless connectivity between wireless devices 110 using time-frequency, physical-layer measurements of the electromagnetic environment.

The console 140 can provide a user interface for security personnel or system administrators to obtain visibility into operations of the signal analysis system 130 and determinations about the various wireless devices 110 made from the electromagnetic environment. The signal analysis system 130 may track, monitor, record, and playback the position and activity of the various wireless devices 110 including suspected rogue, unauthorized, or malicious devices. A system administrator, or other user, may use the console 140 to discover, track, and otherwise analyze a malicious wireless device 110 operating within a wireless infrastructure. The administrator may be provided with a visualization of the position of the wireless devices 110 in the environment. The visualization may include metadata for each of the wireless devices 110. For each given wireless device 110, the metadata may include physical layer specifications such as modulation, protocols, symbol rates, bandwidths, or frequencies; a likelihood metric that the device is rogue, unauthorized, or malicious; a type of attack, if any, being employed by the device; and other wireless devices 110 that the particular device is likely to be communicating with.

The technology presented herein may support detecting, locating, and classifying infected wireless devices 110. Infected wireless devices 110 may have become susceptible to malicious software causing the device to perform one or more undesired behaviors. Such behaviors may include disrupting other wireless devices 110, infecting other wireless devices 110, surreptitiously recording and transmitting audio/video, transmitting sensitive data to a third party, other attacks presented herein, or any combinations thereof. The signal analysis system 130 may address such threats by detecting, geolocating, and classifying signals characteristic of infected wireless devices 110. The signal analysis system 130 may alert a user, such as an administrator, to the location of the infected wireless device 110. The alert may be provided via, or in association with, the console 140.

The technology presented herein may support detecting, locating, and classifying wireless devices 110 that are susceptible to wireless attack. In addition to inherent weaknesses in certain devices, protocols, or software versions, an attacker may attempt to place a target wireless device 110 into an insecure or vulnerable state as a precursor to the actual attack. While many wireless devices 110 implement countermeasures to prevent them from being infected with malicious software or otherwise compromised, attacks may attempt to override or otherwise circumvent these protections. As examples, encryption and secure authentication intended to prevent wireless attacks, may be circumvented. A condition where a wireless device 110 has been placed into such a vulnerable state may be observed from the radio emissions of the wireless device 110. The signal analysis system 130 may detect, geolocate, and classify signals characteristic of vulnerable devices.

One example of detecting a wireless device 110 that may be susceptible to wireless attack, is identifying that a mobile telephone that is operating in 2G mode even when 3G or 4G modes are available on the device and from the service provider. A threat may be in play to snoop text (SMS) messages since the 2G standard may send such messages without encryption. Where sensitive information, such as a password reset code, is transmitted using text (SMS) messages and an attacker has forced the mobile telephone into 2G mode, the sensitive information may be compromised.

Another example of detecting a wireless device 110 that may be susceptible to wireless attack, is identifying that a BLUETOOTH device is configured to allow for unauthenticated pairings of other BLUETOOTH devices. An attacker can take advantage of such a open pairing state to connect to a BLUETOOTH device and extract data or install malicious software.

The technology presented herein may support detecting, locating, and classifying wireless signal jamming attacks. Wireless systems are generally susceptible to jamming attacks where a malicious actor transmits wireless signals with the intent of blocking the wireless function of other wireless devices 110 in the vicinity. Radio jamming may be implemented as a barrage of radio frequency noise. More sophisticated jamming may involve a jamming signal that is crafted to efficiently and specifically target only a subset of wireless systems in the environment that are operating on certain frequencies, using certain modulation techniques, or implementing certain protocols. The signal analysis system 130 may detect, geolocate, and classify jamming signals.

The technology presented herein may support detecting, locating, and classifying impersonation attacks. Various wireless systems may be susceptible to impersonation attacks where a malicious actor transmits wireless signals with the intent of impersonating a recognized wireless signal. The objective of such an attack may be to control, block, or collect information from a wirelessly connected system. Such an attack may also target wireless mesh networks, where, through a variety of impersonation techniques, the attacker may change the network behavior to achieve malicious objectives. The following four examples demonstrate how impersonation attacks may threaten various types of systems. It should be appreciated that these are only examples and various other types of impersonation attacks may be detected, located, classified, and thwarted according to the technology presented herein.

A first example of an impersonation attack is against a building control and automation system that uses wirelessly connected temperature sensors to control the heating and cooling of a building. A wireless impersonation attack can impersonate the temperature sensors to wirelessly signal a low temperature thereby causing the heating system to heat the building. If, for example, the heating system is associated with a critical data center, excessive heat could destroy computer hardware or other systems in the data center.

A second example of an impersonation attack involves mobile or cellular wireless systems. In a mobile or cellular wireless system, base station equipment is generally installed and operated by a mobile carrier to support connections from user equipment wireless devices 110. These wireless devices 110 include user equipment mobile devices such as telephone handsets, smartphones, paging devices, data hotspots, and so forth. A malicious agent may provide an impersonated base station that advertises to user equipment wireless devices 110 that it is a base station from the mobile carrier supporting voice and data service. A user equipment wireless device 110 may unsuspectingly connect to the impersonated base station and route data and voice traffic through the impersonated base station. The impersonated base station may then maliciously read and modify data and voice content associated with the user equipment wireless device 110. User equipment wireless devices 110 often trust the base station they are connected to as having the authority of the mobile carrier provider and thus allow remote updating and installation of software or firmware through the base station. Accordingly, malicious actors may leverage impersonating base stations to install and execute unauthorized software on user equipment wireless device 110.

A third example of an impersonation attack involves wireless devices 110, such as onboard wireless sensors, associated with automotive systems. These sensors may be associated with temperature, braking, tire pressure, fluid levels, safety systems, or any other components of a vehicle. As an example, a tire pressure sensor may act as a wireless device 110 that transmits tire pressure to a vehicle control computer. In such a system, tire pressure measurements outside of a specified acceptable operating range, may cause the vehicle control computer to alert the driver, limit the speed of the vehicle, signal for roadside assistance, or carry out other specified reactions. A wireless attacker impersonating such a tire pressure sensor may cause such reactions to occur inappropriately, or block them from occurring as they were intended.

A fourth example of an impersonation attack involves a building security system. Building security systems often include building sensors acting as wireless devices 110. These building sensors may include door sensors, glass-break sensors, motion sensors, thermal sensors, and so forth.

Measurements or signals from the building sensors may be used by the building security system to determine whether or not to signal an alarm event. A wireless attacker can impersonate signals from building sensors to disguise an unauthorized entry into the building, to cause a false alarm, or otherwise interfere with building security systems functionality.

The technology presented herein may support detecting, locating, classifying, and thwarting attacks associated with spoofing control information within a wireless network. By spoofing routing information, a malicious wireless device 110 can disrupt the wireless network by creating inefficient network routes, attracting network traffic, force network traffic away from intended destinations, or otherwise disrupting or preventing normal network operations. Similarly, a malicious wireless device 110 might spoof medium access control information, or other addressing information, to configure network nodes into a vulnerable state.

The technology presented herein may support detecting, locating, classifying, and thwarting attacks associated with sinkhole or black hole attacks on a wireless network. According to certain examples of such an attack type, a malicious wireless device 110 may attempt to lure network routes to pass through it, by advertising advantageous link quality. This may result in creating a critical point where many, or all, routes pass and thus become exposed to network disruption, data siphoning, or various other exploits.

The technology presented herein may support detecting, locating, classifying, and thwarting attacks associated with selective dropping or selective forwarding attacks within a wireless network. According to certain examples of such an attack type, a malicious wireless device 110 may attempt to drop certain critical network packets in order to degrade network performance or to force a new network topology.

The technology presented herein may support detecting, locating, classifying, and thwarting attacks associated with Sybil attacks within a wireless network. According to certain examples of such an attack type, malicious wireless devices 110 may advertise themselves in different ways to different unsuspecting wireless device 110 nodes in the network. By doing so, a malicious wireless device 110 can appear to be multiple nodes, thereby subverting security mechanisms that depend on network redundancy and distribution routing. Since fault tolerant schemes may depend upon broad network consensus to detect malicious nodes, a Sybil attack advertising a malicious wireless device 110 as multiple nodes can cast multiple votes and overrun the consensus ballot box making the network appear secure to other unsuspecting wireless device 110 nodes.

The technology presented herein may support detecting, locating, classifying, and thwarting attacks associated with Hello flood attacks within a wireless network. According to certain examples of such an attack type, malicious wireless devices 110 may exploit networks employing routing algorithms where a Hello packet advertises nodes. Malicious wireless devices 110 may break medium access rules and transmit with high power to advertise itself to even distant network nodes. Hello flood attacks may also be used to establish a sinkhole, carry out a Sybil attack, or perform other network security exploits.

The technology presented herein may support detecting, locating, classifying, and thwarting attacks associated with wormhole attacks on a wireless network. According to certain examples of such an attack type, when two malicious wireless devices 110 have access to a low-latency link outside of the wireless network, the pair can create the perception within the network that they are artificially close to other wireless device 110 nodes in the network, as though they provide a wormhole through the network. Wormhole attacks can be used to force a network to converge on an inefficient routing topology. Wormhole attacks can also be used to win routing races and more effectively spoof other network nodes.

The technology presented herein may support detecting, locating, classifying, and thwarting attacks associated with badmouthing or blacklisting attacks within a wireless network. According to certain examples of such an attack type, malicious wireless devices 110 may exploit consensus trust mechanisms intended to detect errant behavior. A malicious wireless device 110 can degrade the network by reporting legitimate network nodes as suspicious. When coupled with a Sybil attack, a malicious wireless device 110 can amplify the effect of the blacklisting by replicating mistrust reports from multiple impersonated nodes.

The technology presented herein may support detecting, locating, and classifying wireless transmissions from wireless device 110 in an unauthorized area. Certain areas, at certain times, may be unauthorized for certain types of wireless transmissions. For example, medical facilities with sensitive medical equipment may be unauthorized for any wireless transmission that may potentially interfere with the medical equipment. As another example, aircraft during takeoff and landing may be unauthorized for Wi-Fi or mobile carrier communications. Various similar authorization restrictions may exist in call centers, offices dealing with sensitive personal information, military installations, or otherwise secure government facilities.

The technology presented herein may support detecting, locating, and classifying auxiliary wireless devices 110 associated with cyber security attacks or physical security attacks. In such attacks, wireless signals may be used in conjunction with other malicious methods to perpetrate physical and cyber attacks. Broadly speaking, wireless systems may be used to allow the attacker remote access. Wireless systems may be also be used to control an attack infrastructure. One example of such a threat may involve card skimming at point of sales systems or automated teller machines. An attacker may position covert hardware to a card reader slot such that the covert hardware is not noticeable by users who freely slide their cards into the point of sale systems or automated teller machine. The covert hardware may store information associated with scanned cards to be wirelessly collected to a remote location.

Figure 8:
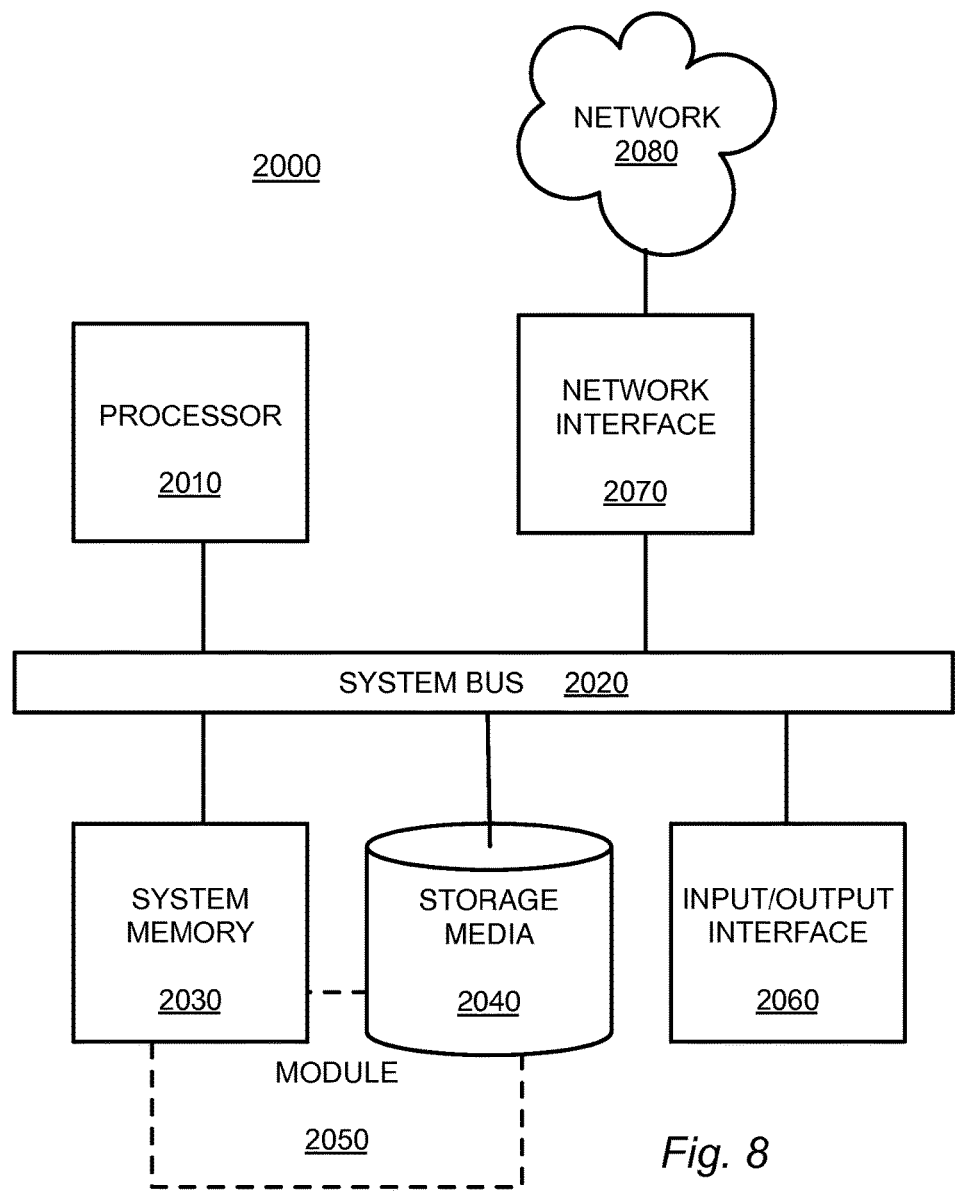
FIG. 8 is a block diagram depicting a computing machine and a module in accordance with one or more embodiments presented herein.

The wireless devices 110, sensors 120, signal analysis system 130, console 140, or any other systems associated with the technology presented herein may be any type of computing machine such as, but not limited to, those discussed in more detail with respect to FIG. 8. Furthermore, any modules associated with any of these computing machines or any other modules (scripts, web content, software, firmware, or hardware) associated with the technology presented herein may by any of the modules discussed in more detail with respect to FIG. 8. The devices and computing machines discussed herein may communicate with one another as well as other computer machines or communication systems over one or more networks such as network 150. The network 150 may include any type of data or communications links or network technology including any of the network technology discussed with respect to FIG. 8.

Figure 2:
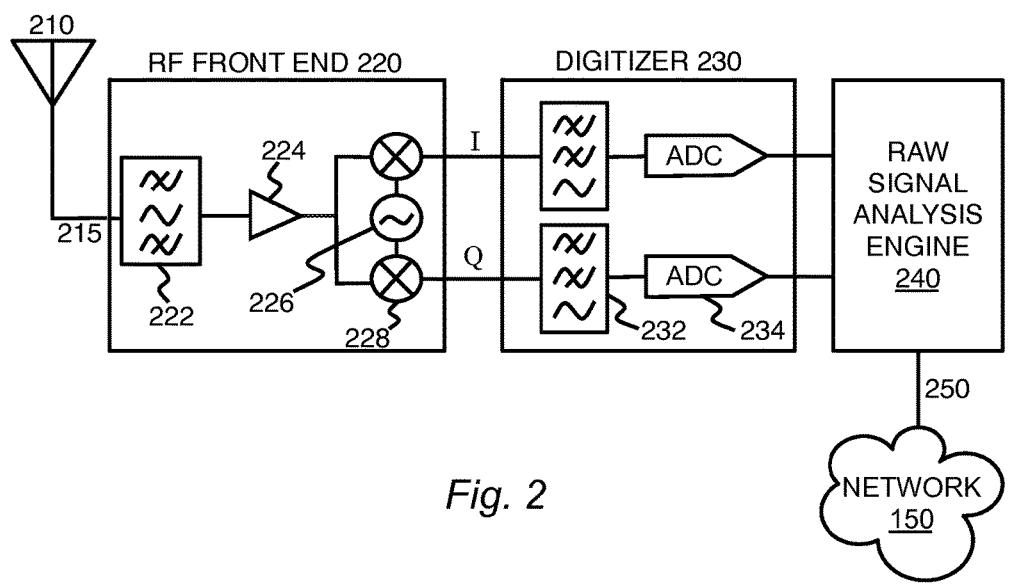
FIG. 2 is a block diagram depicting a sensor incorporating a software-defined radio receiver in accordance with one or more embodiments presented herein.

FIG. 2 is a block diagram depicting a sensor 120 incorporating a software-defined radio receiver in accordance with one or more embodiments presented herein. An antenna 210 may receive a radio frequency signal 215. The radio frequency signal 215 may be coupled into a radio frequency front end 220. The radio frequency front end 220 may condition the radio frequency signal 215 to generate an analog output signal. The analog output signal may comprise in-phase and quadrature components referred to as I and Q signals. The analog output from the radio frequency front end 220 may be coupled to a digitizer 230. The digitizer can output data that is a digital representation of the analog output generated by the radio frequency front end 220. The digital representation may be sampled in time and quantized in amplitude. The digital representation may also comprise separate I data and Q data. A raw signal analysis engine 240 may receive and process the raw digital representation generated by the digitizer 230. A raw signal analysis output 250 may be the results of processing associated with the raw signal analysis engine 240. The raw signal analysis output 250 may be communicated onto the network 150 for further processing.

The antenna 210 may be used to collect a broad range of radio frequency signals from the electromagnetic environment for analysis. The antennas 210 may use various antenna geometries. According to certain examples, the antennas 210 may be monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 210 can be located in various locations around a room, around a building, or within different areas or floors of a building.

According to certain example embodiments of the radio frequency front end 220, a radio-frequency band-pass filter 222 can select a channel, or a frequency range, from the radio frequency signal 215. A low noise amplifier 224 may be used to increase the amplitude of the signal from the selected channel. A signal from a variable-frequency oscillator 226 may be combined, or mixed, with the radio frequency signal by a mixer 228. Mixing the radio frequency signal with both the signal from a variable-frequency oscillator 226 and an out-of-phase copy of the oscillator output may be used to generate both in-phase and quadrature (I and Q) components. The frequency of the variable-frequency oscillator 226 may be tuned to down-convert the radio frequency signal to a lower frequency such as baseband, an intermediate frequency, or some other local oscillator frequency.

According to certain example embodiments of the digitizer 230, a low-pass filter 232 may be applied to the I and the Q signals from the radio frequency front end 220. The low-pass filter 232 may be useful as an anti-aliasing filter before digitizing the signal. An analog to digital converter (ADC) 234 can convert the continuous, analog signal into a digital value that represents a time sampling of an amplitude associated with the continuous signal. The sampling may be quantized in amplitude and may be periodic in time. The mathematical inverse of this sampling period may be referred to as the sampling frequency. The output of the ADC 234 may be a sampled sequence of digital values that have been converted from a continuous-amplitude and continuous-time analog signal to a discrete-amplitude and discrete-time digital signal. According to certain embodiments, both I and Q signal components may be separately filtered and converted. Accordingly, there may be two separate low-pass filters 232 and two separate analog to digital converters 234.

The raw signal analysis engine 240 may be implemented in software, firmware, programmable logic, or other such flexible technology. Accordingly, the raw signal analysis engine 240 may be considered as (all, or part of) the software portion of the software-defined radio receiver. The raw signal analysis engine 240 can process a digital representation of the raw collected radio frequency signal 215. The raw signal analysis engine 240 may receive digital I and Q signal samples from the digitizer 230. The received samples may be processed and refined to a discrete set of feature vectors. A signal feature vector may be a set of values representing attributes of the signal. Feature vectors may be passed from one stage of analysis or processing to another. At each step, attributes may be added or subtracted from the feature vector further refining the attributes of the particular signal. Such refinement of the feature vector may support identifying, classifying, or otherwise interpreting the content of the signal. During this hierarchical and/or iterative interpretation of the signal various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth. It should be understood that the feature vectors may be processed and re-processed by the raw signal analysis engine 240 any number of times in order to refine description of signal contents from the collected radio frequency signal 215.

The raw signal analysis engine 240 may generate a raw signal analysis output 250. The raw signal analysis output 250 may be a condensed collection of intelligible features and data as identified within the collected radio frequency signal 215. According to one or more embodiments, the signal data may be processed and refined into feature vectors that define various attributes of the signal. The raw signal analysis output 250, including such feature vectors, may be transmitted onto the network 150 for further processing and analysis. This processing and analysis may be carried out in association with the signal analysis system 130.

It should be appreciated that aspects of the receiver presented herein may be programmable, adjustable, or otherwise controllable. In addition to the software (or otherwise flexible) portion of the receiver, agility and configurability may be supported by elements of the radio frequency front end 220 and the digitizer 230 that are programmable, adjustable, or otherwise controllable. Parameters associated with these elements may include a pass-band of the band-pass filter 222, a gain of the low noise amplifier 224, a frequency of the oscillator 226, a cut-off response of the low-pass filter 232, a sampling rate of the ADC 234, and so forth.

It should be appreciated that while certain example sensors 120 presented herein may be software-defined radios, other example sensors 120 may be hardware-defined radios or simply hardware radios. Generally, a hardware radio is fixed to operate on predefined frequencies, bandwidths, modulation techniques, coding, protocols, and wireless communications standards. For example, a hardware radio may be specifically designed to receive one specific standard such as Wi-Fi signals, BLUETOOTH signals, or mobile telephone signals. In contrast, a software-defined radio may be reconfigurable using software to handle any number of different communication standards even custom or otherwise non-standards-driven wireless communications. It should be appreciated that a hardware radio is often highly integrated, specifically designed for its single purpose, and thus considerably less costly to implement than a software-defined radio. Accordingly, it may be said that there is a tradeoff between cost and flexibility when comparing hardware radios and software-defined radios. Software-defined radios are generally much more flexible but considerably more costly while hardware radios are generally less flexible but also less costly.

It should be appreciated that, according to certain embodiments, the sensors 120 presented herein as part of an electromagnetic monitoring and detection network may share hardware and/or software resources with production networks used by wireless devices 110 associated with end users. For example, a sensor 120 used for monitoring the electromagnetic environment may also be used to supply certain wireless communications features. According to certain examples, wireless communication components (such as wireless access points) that support wireless communications for a production network of an origination may integrate features and functionality presented herein for collecting electromagnetic signals for signature or threat analysis.

Figure 3:
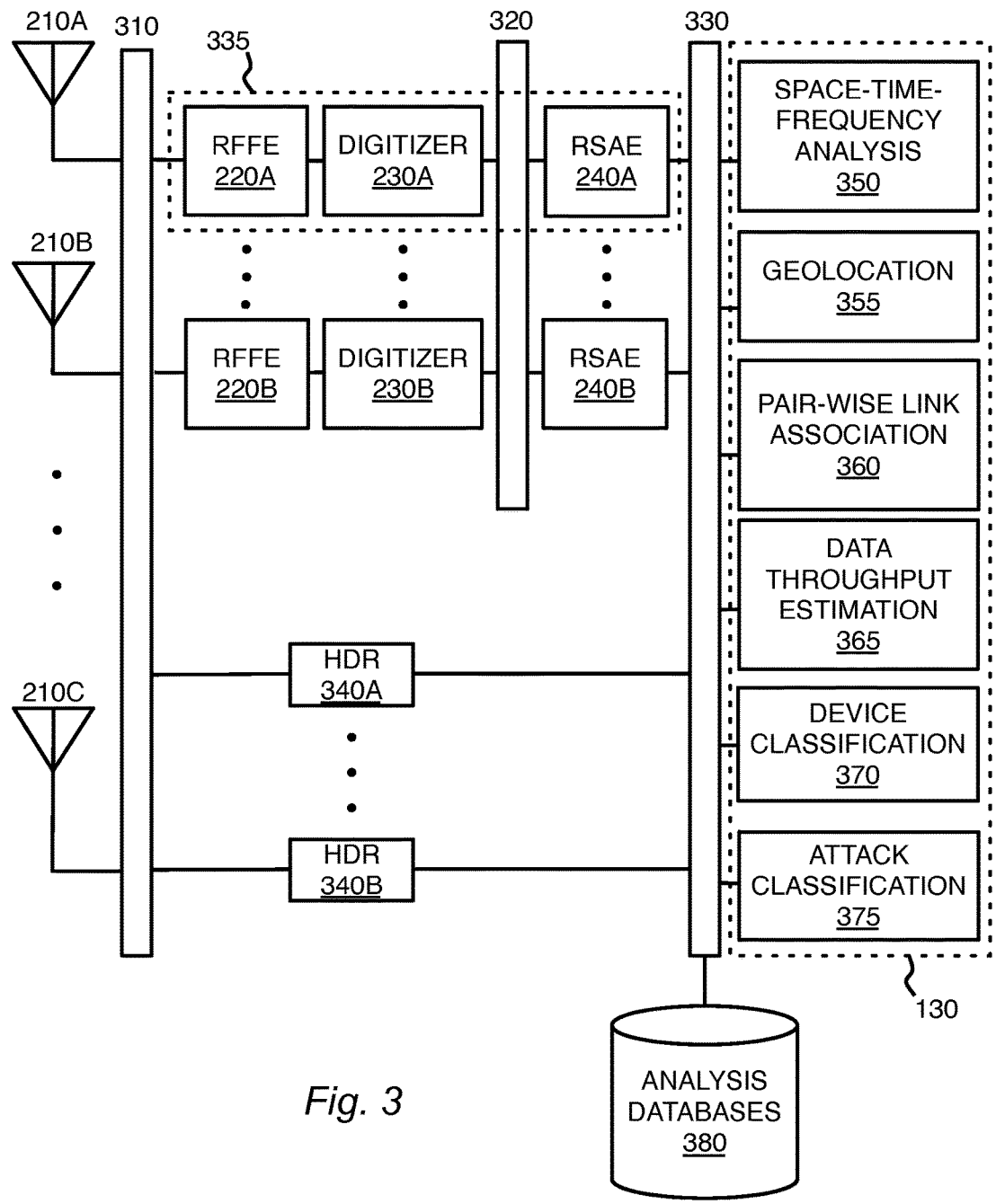
FIG. 3 is a block diagram depicting a processing architecture for electromagnetic signature analysis in accordance with one or more embodiments presented herein.

FIG. 3 is a block diagram depicting a processing architecture for electromagnetic signature analysis in accordance with one or more embodiments presented herein. A plurality of antennas 210 may be coupled to one or more receivers via an antenna signal-switching network 310. The receivers may comprise one or more software-defined radios 335. The receivers may also comprise one or more hardware-defined radios 340A-340B. The hardware-defined radios 340A-340B may be referred to, in general or collectively, as hardware-defined radios 340 or a hardware-defined radio 340. Each of the software-defined radios 335 may comprise a radio frequency front end 220, a digitizer 230, and a raw signal analysis engine 240. The raw signal analysis engines 240 may be coupled to the digitizers 230 via a raw digital signal switching network 320. The outputs of the receivers, both the software-defined radios 335 and the hardware-defined radios 340, may be coupled through one or more layers, or stages, of a signal feature vector network 330. Various modules associated with the signal analysis system 130 may further process these receiver outputs. These modules may include, for example, space-time-frequency analysis 350, geolocation 355, pair-wise link association 360, data throughput estimation 365, device classification 370, and attack classification 375. Operations of the raw signal analysis engine 240 and/or the various modules associated with the signal analysis system 130 may be supported by various analysis databases 380.

The antenna signal-switching network 310 can support switching and routing radio frequency signals 215 received by the antennas 210 to various radio receivers. Accordingly, the antenna signal-switching network 310 may be referred to as an antenna feed network. The radio receivers may include both the software-defined radios 335 as well as the hardware-defined radios 340. The radio frequency signals 215 may be coupled from the antennas 210 using coaxial cable or other conductive transmission line or waveguide technology. The radio frequency signals 215 may also be coupled from the antennas 210 using radio frequency to optical converters, optical modulators, radio-over-fiber technology, or other techniques for transmitting the signal over optical fiber or other optical waveguides. The radio frequency signals 215 may be switched within the antenna signal-switching network 310 using mechanical switches, electro-mechanical switches, radio frequency switches, semiconductor switches, optical switches, electro-optical switches, or other signal path switching technology.

The antenna signal-switching network 310 can support switching and routing the radio frequency signals 215 from one particular antenna 210 between some or all of the receivers within the system. According to certain embodiments, the antenna signal-switching network 310 may be fully interconnected, wherein any of the antennas 210 may be switched to any of the receivers. According to certain other embodiments where the antenna signal-switching network 310 may support a lesser degree of interconnectivity, a subset of the antennas 210 may be switchable between a subset of the receivers. According to some embodiments, certain receivers may be directly coupled to certain antennas 210 without being switchable.

The antenna signal-switching network 310 may comprise various switching topologies such as matrix, crossbar, one-to-many, many-to-one, fan-out, sparse fan-out, star, ring, any other structure, or any combination thereof. The antenna signal-switching network 310 may be controlled manually or automatically by any of the computing machines or modules presented herein. The antenna signal-switching network 310 may comprise one or more direct radio frequency interconnections, one or more radio frequency signal switches, one or more radio frequency signal splitters, and various other mechanisms for switching and routing radio frequency signals.

One reconfiguration example associated with the antenna signal-switching network 310 may involve receiving a BLUETOOTH wireless signal. According to the example, upon determining that the particular radio frequency signal 215 detected at a particular antenna 210 contains a BLUETOOTH signal, the signal analysis system 130 may use the antenna signal-switching network 310 to redirect that particular radio frequency signal 215 from a software-defined radio 335 instead to a hardware-defined radio 340 specifically designed to receive and decode BLUETOOTH signals. Such automated reconfiguration may improve specialized decoding of the BLUETOOTH signal while also freeing resources within the software-defined radio 335 from tasks more efficiently suited to the appropriate hardware-defined radio 340. It should be appreciated that while BLUETOOTH was specified in this signal path reconfiguration example, the same benefits may apply to wireless communication modalities other than BLUETOOTH where an appropriate hardware-defined radio 340 is available to offload tasks from a software-defined radio 335.

It should also be appreciated that while the BLUETOOTH signal-path reconfiguration example used a BLUETOOTH signal received at a software-defined radio 335 to cue switching the radio frequency signal 215 to a hardware-defined radio 340, other example scenarios may involve a signal received at a hardware-defined radio 340 being used to cue switching the radio frequency signal 215 to a software-defined radio 335. For example, the radio frequency signal 215 may be redirected to a software-defined radio 335 that is capable of smart-antenna processing while the original hardware-defined radio 340 was configured to handle only one radio frequency input. Smart-antenna processing can combine the radio frequency signal 215 from two or more antennas 210. This may be referred to as beam forming, MIMO, and so forth. Multiple antenna sources may be combined in order to directionally discriminate the source wireless device 110 for a desired electromagnetic emission. Such directionality may be computationally obtained from multiple antenna sources instead of physically orienting a directional antenna. Directionality can support extracting a weak signal, differentiating a signal from various interferers, or otherwise improving reception of a signal that presented poorly at a single antenna 210 or even multiple original antennas 210. The antenna signal-switching network 310 can support matching the proper antennas 210 to the proper receiver inputs for optimizing smart-antenna processing. While one or more of the hardware-defined receivers 340 may be configured to support smart-antenna processing through multiple antenna inputs, the software-defined receivers 335 may inherently support smart-antenna processing through computationally combining the sampled signals from multiple digitizers 230 during the software portion of the receiver operation.

The antenna signal-switching network 310 may also incorporate one or more splitters. The splitters may be used to replicate the particular radio frequency signal 215 a number of times for distribution to two or more receivers. For example, a hardware receiver 340 may be assigned to extract a Wi-Fi signal from the radio frequency signal 215 at the same time that a copy of the radio frequency signal 215 may be routed to a software-defined receiver 335 to process some other signals detected at the same antenna 210. According to certain embodiments, smart-antenna processing can cue combining of signals within the antenna signal-switching network 310. It should be appreciated that the number of antennas 210 and the number of receivers may not be the same. For example, there may be additional antennas 210 to allow a choice of which antennas 210 may be routed to the receivers through the antenna signal-switching network 310. According to other embodiments, there may be fewer antennas 210 than receivers, or the numbers may be similar or even the same.

The antenna signal-switching network 310 can support intelligent allocation of the radio frequency signal 215 from the various antennas 210 to the various receivers. For example, complicated signal analysis cases, or those requiring directional processing, may be routed to one or more software-defined receivers 335 while signals may be routed to efficient and inexpensive hardware-defined radios 340 where appropriate. The more flexible the antenna signal-switching network 310, the more optimally the signal processing allocation may be made between the various resources within the system.

The software-defined radios 335 generally comprising radio frequency front ends 220, digitizers 230, and one or more digital signal processing stages to computationally process outputs from the digitizers 230. The digital signal processing stages may include the raw signal analysis engines 240. The digital signal processing stages may also include one or more modules associated with the signal analysis system 130. These modules may include, among other example modules, space-time-frequency analysis 350, geolocation 355, pair-wise link association 360, data throughput estimation 365, device classification 370, and attack classification 375. It should be appreciated that in addition to the illustrated embodiment that separates the raw signal analysis engines 240 from the signal analysis system 130, various other embodiments may incorporate the raw signal analysis engines 240 with one or more of the modules associated with the signal analysis system 130. Such incorporated digital signal processing stages may be considered either (or both) part of the raw signal analysis engines 240 or part of the signal analysis system 130 without departing from the scope or spirit of the technology presented herein.

The raw signal analysis engine 240 may receive digitally sampled I and Q signals from the digitizer 230. The raw signal analysis engine 240 can process this digital representation of the raw collected radio frequency signal 215 to generate a discrete set of feature vectors. For example, the raw signal analysis engine 240 may perform time-frequency analysis of the radio frequency signal 215 from a particular antenna 210. The time-frequency information from the radio frequency signal 215 may be encoded as a feature vector. For example, time-frequency bins may be defined and the spectral intensity of the radio frequency signal 215 corresponding to each time-frequency bin may be represented within the feature vector. The raw signal analysis engine 240 may also perform angle analysis where an angle dimension for the radio frequency signal 215 may be added to each feature vector. The raw signal analysis engine 240 may also perform modulation classification and signal decoding where feature vectors may be refined by appending dimensions representing additional features associated with modulation and decoded signal contents.

The raw digital signal switching network 320 can switch and route the outputs from one or more digitizers 230 to the inputs of one or more raw signal analysis engine 240. The output from each digitizer 230 may be a stream of digital I signal samples and digital Q signal samples. The I and Q samples may be communicated as two separate streams or as a single combined or interleaved stream. These streams may be routed to the appropriate raw signal analysis engines 240 at packetized data or as a clocked (or asynchronous) stream of parallel or serialized data. Switching and routing within the raw digital signal switching network 320 can allocate the output each digitizer 230 to the most appropriate and available raw signal analysis engine 240 according to one or more metrics such as route distance, resource capacity, performance, availability, cost, and so forth.

The signal feature vector network 330 can switch and route signal feature vectors between the raw signal analysis engines 240 and the various other modules associated with the signal analysis system 130. The signal analysis system 130 may comprise a signal aggregation and analysis engine comprised of one or more feature vector processors. The signal feature vectors may be transported within the signal feature vector network 330 as packetized data or streaming data. Generally, a signal feature vector may be a set of values representing attributes of a particular signal. In various embodiments, as a feature vector is passed from one processing module or stage to the next, attributes may be added or subtracted from the feature vector, further refining the attributes of the particular signal to better identify and/or classify the contents of the signal. Feature vectors may be appended for various feature attributes relevant to the processing at each module or processing stage. According to one particular example, a geolocation feature vector may indicate a feature vector that has geolocation features added to its set of attributes. The geolocation feature vector may include, the specific geolocation features of the signal, as well values indicating duration of the signal, bandwidth of the signal, angle of the signal, a modulation type of the signal, and so forth.

The radio frequency signals 215 captured form the electromagnetic environment by the sensors 120 may be used in detecting, classifying, and mitigating wireless attacks against one or more wireless devices 110. Various digital signal processing stages may be applied to the signals collected by the sensors 120. These digital signal processing stages may comprise modules of the signal analysis system 130 including one or more raw signal analysis engines 240. Various sensor mesh architectures comprising the sensors 120, the antenna signal-switching network 310, the raw digital signal-switching network 320, and the signal feature vector network 330 can support collecting and appropriately transporting signals from the electromagnetic environment for signature and wireless threat analysis. Similarly, various processing architectures comprising modules of the signal analysis system 130 including one or more raw signal analysis engines 240 can support the various processing states of these signals for signature and wireless threat analysis.

The signal analysis system 130 can aggregate and process the various radio frequency signals 215 captured form the electromagnetic environment by the sensors 120. Example modules of the signal analysis system 130 may include space-time-frequency analysis 350, geolocation 355, pair-wise link association 360, data throughput estimation 365, device classification 370, and attack classification 375. It should be appreciated that the various modules of the signal analysis system 130 may receive sampled signals and/or signal feature vectors from one or more software-defined radios 335. Similarly, any data, packets, signal levels, channel parameters, error conditions, or other parameters obtained by one or more hardware-define radios 340 may be relayed to the various modules of the signal analysis system 130 for processing. Since a hardware-define radio 340 may perform its own raw signal analysis and output information specific to its design, outputs from various hardware-define radios 340 may be translated to radio-specific signal feature vectors. These particular signal feature vectors may be limited by the particular output space of any given hardware-define radio 340.

The space-time-frequency analysis module 350 can process refined feature vectors from multiple sensors 120 and match them up to a common reference frame. The space-time-frequency analysis module 350 can also resolve redundant signal detection when the same signal is detected at more than one sensor 120.

The space-time-frequency analysis module 350 can perform signal clustering and association. Feature vectors from multiple sensors 120 may be clustered into common groups. Clustering may be supporting using a k-nearest neighbors (KNN) algorithm, a hierarchical clustering algorithm, an expectation maximization algorithm, or any other clustering algorithm. A specific clustering algorithm may be chosen to maximize system performance. For example, a Monte Carlo approach may be used to evaluate multiple clustering algorithms against a reference signal set to select the clustering algorithm that maximizes a particular system performance objective. The system performance objective function may be an aggregation of performance metrics including signal detection accuracy, modulation classification accuracy, attack classification accuracy, and processing speed.

The space-time-frequency analysis module 350 can perform feature extraction. Feature extraction can cull disparate refined feature vectors from multiple sensors 120 into an aggregate feature vector that represents all of the information about wireless devices 110 in the environment with minimal, or significantly reduced, redundancy. Certain dimensions of aggregated feature vectors may provide identical valued across multiple sensors 120. These may include duration, bandwidth, center frequency, and duty cycle, among others. Certain other dimensions of aggregated feature vectors may be maintained as a list of potentially disparate values, with each value corresponding to a single sensor 120. For instance, the dimensions of the aggregate feature vectors representing a power and an angle of a signal may vary across sensors 120.

The geolocation module 355 can receive the aggregate feature vector set. Geolocating signals in an environment that is dense with other signals and contains complex propagation effects like multipath and Doppler shift can present several challenges. To aid in estimate the position of each signal, propagation modeling may leverage a database of sensor positions and various parameters associated with the propagation environment. The database may be populated through various possible calibration techniques. According to a particular example, the calibration may involve transmitting from wireless devices 110 with known positions. Each sensor 120 can record the received power of each of the reference emissions from the wireless devices 110 with known positions. From all of the known values, a parametric fit for the unknown propagation values may be performed. According to one example of this approach, the collected receiver power from the $i^{th}$ reference emitter received by the $r^{th}$ sensor 120 may be represented as:

$$P_{i,r} = a/d_{i,r}^{n}$$

where a and n are the unknown calibration parameters to be estimated and $d_{i,r}$ is the known distance between the $i^{th}$ reference emitter wireless device 110 and the $r^{th}$ sensor 120. When the number of sensors 120 is given as R and the number of reference emitter wireless devices 110 is given as I, then the calibration process results in R×I equations in two unknowns. Various optimization methods may be used to solve for the unknowns including, but not limited to, least-squares estimation, minimum-mean-square estimation, constrained optimization, and so forth.

Propagation modeling functionality of the geolocation module 355 may leverage the calibration parameters, signal power and angle values, and a coordinate system of locations for the sensors 120 to calculate a forward model of the expected power and angle values for sample points in space. According to particular embodiments, the model values may be used to create an initial geolocation estimate using multilateration techniques. The initial geolocation estimate may be used to seed a model-matching filter. The model-matching filter can evaluate multiple aggregated feature vectors in series. For each aggregate feature vector, the model-matching filter may initialize an ensemble of hypothesized signal source positions around the initial seed position. In an iterative process using the model values, a tighter estimate of the aggregate feature vector position may be generated for the wireless device 110 being located. As part of each iteration, hypothesized positions that do not fit the model may be removed. After a sufficient number of iterations, the position estimate for the aggregate feature vector may converge to a single point. This approach may be repeated for all aggregate feature vectors.

Model tracking may use a similar technique of hypothesized positions, however the hypothesis set may also include a range of time steps. Multiple iterations of hypothesized trajectories (or tracks) may be examined where prior information about the likelihood of each trajectory may be considered in the model. By filtering out unlikely tracks, a track may be converged that best fits the data. For example, it is likely that a mobile device will be traveling at 2 m/s, but it is unlikely that it will be traveling at 200 m/s. Accordingly, a track indicating an aggregate feature vector from a mobile device traveling at 200 m/s may be filtered out of the model. Resultant geolocation track data may be incorporated into the aggregate feature vector to create a feature vector that includes location data.

The pair-wise link association module 360 may determine a link pair of wireless devices 110. Generally a signal emanates from a source wireless device 110 and is intended for one or more destination wireless devices 110. The emitting device and a receiving device may constitute a link pair. Information about link pairings may be useful in inferring the behavior and intent of wireless devices 110 within a network.

Modulation association may be implemented within the pair-wise link association module 360. Generally, wireless devices 110 within a wireless network participate in pair-wise links between devices. The pair-wise link association module 360 can infer these pair-wise links from observed wireless features such as modulation, position, space-time-frequency occupancy, and so forth. Modulation association can analyze modulation feature information to calculate a likelihood that any pair of wireless devices 110 are communicating with one another.

Pair-wise links may also be determined by examining decoded message contents. For example, Wi-Fi header fields explicitly indicate a destination MAC address. When it is not clear from the decoded signal which pairs of wireless devices 110 is communicating, then space-time-frequency association may be used to perform a more nuanced evaluation for likely communication pairs. Signal pairing mechanisms such as time division duplexing (TDD), frequency division duplexing (FDD), or space division duplexing (SDD) may indicate communicating pairs of wireless devices 110. Space-time-frequency feature information for each geolocation feature vector may be used to determine which signals could feasibly be communicating with one or more known duplexing schemes. For example, if a first geolocation feature vector and a second geolocation feature vector both occupy the same frequency, but never at an overlapping time, it may be inferred that the wireless devices 110 associated with those vectors may be a communicating pair using TDD. Feature vectors successfully evaluated by the pair-wise link association module may be appended with a new set of feature vectors that contain the pairwise link information. These may be referred to as pairwise feature vectors.

The data throughput estimation module 365 can estimate an amount of data in each pairwise feature vector. Even when signal content data is not directly decoded, its spectral occupancy may serve as a proxy for the amount of data that is being passed through each link wireless devices 110 associated with each pairwise feature vector. This estimation may occur on two levels. The first level, spectrogram analysis, can use Shannon's capacity formula $$C = B \log(1+\text{SNR})$$

to bound the maximum amount of data transfer, where B is the occupied bandwidth and SNR is the signal to noise ratio. These two parameters may be estimated using the features estimated the signal analysis system 130. Specifically, B can be directly calculated from spectrogram analysis and SNR can be calculated from the average power and geolocation data. The second level, modulation and link analysis, can leverage a signal signature database containing data throughput values for various known signal modulation schemes. By pairing the modulation feature values included in the pair-wise feature vector with the signal signature database entries, modulation and link analysis can provide a reasonably accurate estimate of the data throughput for each pair-wise feature vector. An estimate of the data throughput for each signal may be added to each corresponding pair-wise feature vector. The amended pair-wise feature vector may now be referred to as a data throughput feature vector.

The device classification module 370 can classify wireless devices 110 as being either benign or malicious (also referred to as unauthorized or rogue). Devices classification can function to identify each pairwise feature vector as either benign or malicious. The device classification module 370 can perform signature matching, which attempts to match the signal and link features of each data throughput feature vector to known examples of benign and malicious devices in the signal signature database. The device classification module 370 can further perform anomaly analysis, which compares the features associated with each data throughput feature vector into an aggregate metric. If the aggregate metric exceeds one or more established anomaly thresholds the associated wireless device 110 may be flagged as malicious or potentially malicious. The device classification module 370 can also perform location analysis or geo-fencing, which evaluates the geolocation features associated with each feature vector. If an unauthorized wireless device 110 is identified to be within in a restricted area, then the wireless device 110 may be flagged as malicious or potentially malicious.

The attack classification module 375 can determine the type of attack being perpetrated by a malicious wireless device 110. The attack classification module 375 can also determine if multiple malicious wireless devices 110 are involved in the attack and which victim wireless devices 110 are being attacked. The attack classification module 375 can support attack matching, which can use a library of attack templates to match malicious wireless device 110 activities to known attacks such as spoofing, DoS, jamming, wormholes, and others discussed herein or known in the art. The attack classification module 375 can support determination of attacking radios where the pair-wise link features of a malicious wireless device 110 may be used to identify a network of multiple attacking wireless devices 110. Such a network of multiple attacking wireless devices 110 may also be identified without using pair-wise link information depending upon the type of attack. For example, a pair of wireless devices 110 that have been classified as malicious may be clearly jamming on one frequency, but may also be communicating TDD on a second frequency. The attack classification module 375 can support determination of attacking radios to identify these two malicious wireless devices 110 as part of a malicious network executing a distributed jamming attack. The attack classification module 375 can support determination of victim radios for creating a list of wireless devices 110 being attacked by a network of attacking wireless devices 110. According to the distributed jamming attack example, the victim wireless devices 110 may be any network of benign wireless devices 110 using the frequency that is being jammed by the malicious wireless devices 110 of the attack network.

The attack classification module 375 can support attack intent inference to determine a high-level intent for a network of wireless devices 110. Attack intent inference can use an attack database and information regarding the locations and sizes of the networks. Regarding the distributed jamming attack example, if the victim wireless devices 110 being jammed are part of a closed-circuit video surveillance system, attack intent inference may indicate that the intent of the attack is to disable video. If, on the other hand, the victim wireless devices 110 are cellular telephones located in a boardroom, attack intent inference may indicate that the intent of the attack is to block mobile carrier communications in and out of the boardroom.

The analysis databases 380 may include, among various other examples, signal databases, sensor position databases, calibration databases, signal signature databases, and attack databases. One or more of the signal processing and threat analysis stages of the signal analysis system 130, including the raw signal analysis engines 240, may leverage the analysis databases 380. The analysis databases 380 may contain various forms of information useful in analyzing the radio frequency signals collected by the sensors 120. Portions of the information within the analysis databases 380 may be preinstalled at the purchase, installation, or configuration of the sensors 120, the signal analysis system 130, and/or other systems supporting the technology presented herein. Portions of the information within the analysis databases 380 may be configured in the field. Such configuration may be performed manually, or autonomously through automated learning, tuning, or adaptation procedures. Portions of the information within the analysis databases 380 may be updated from time to time from a central provider, from backups, or from other installations. One or more central providers may receive related information that was learned or adapted in fielded installations. The received information may be incorporated into periodic updates provided by the central provider to the various fielded installations of the technology presented herein.

It should be appreciated that while the analysis databases 380 are generically referred to as databases, the information may be stored within tables, relational databases, other types of databases, flat files, memories, lists, data blobs, data structures, or any other data storage or organization technology. The analysis databases 380 may be stored locally at the signal processing and threat analysis modules of the signal analysis system 130 and the raw signal analysis engines 240, within one or more systems attached via the networks 150, online, in a storage cloud, in any other location, or any combination thereof. It should be appreciated that the analysis databases 380 may be distributed at the level of the sensors 120, distributed at the level of the signal processing and threat analysis modules of the signal analysis system 130, centralized at the building level, centralized at the campus level, centralized at the enterprise level, or centralized at the level of one or more providers. Various other granularities or localities of storage for the analysis databases 380 may also be supported with departing form the spirit or scope of the technology presented herein.

The analysis databases 380 may include one or more signal databases. The raw signal analysis engines 240 may leverage the signal databases. The signal databases may comprise information that represents features of known signals to be matched or correlated against received signals. The signal databases may also comprise appropriate codecs and drivers for decoding variously modulated signals.

The analysis databases 380 may include one or more sensor network position databases and one or more calibration databases. The space-time-frequency analysis module 350 and the geolocation module 355 may leverage the sensor network position databases and the calibration databases. The sensor network position databases may include the physical positions of various sensors 120 within the environment. The calibration databases may include various parameters associated with electromagnetic wave propagation within the wireless communication environment.

The analysis databases 380 may include one or more signal signature databases. The pair-wise link association module 360, the data throughput estimation module 365, and the device classification module 370 may leverage information from the signal signature databases. The signal signature databases may contain mappings from signal features to signal types. The signal signature databases may function as a look-up table for the signal analysis and aggregation operations.

The analysis databases 380 may include one or more attack databases. The attack classification module 375 may leverage information from the attack databases. The attack databases may contain information or signal features that are indicative of specific attack types. The attack databases may be used in conjunction with signals collected from the sensors 120 to identify types of attacks being perpetrated by malicious wireless devices 110.

The raw signal analysis engine 240, signal analysis system 130, systems associated with the analysis databases 380, or any other systems associated with the technology presented herein may be any type of computing machine such as, but not limited to, those discussed in more detail with respect to FIG. 8. Furthermore, any modules (such as those associated with space-time-frequency analysis 350, geolocation 355, pair-wise link association 360, data throughput estimation 365, device classification 370, or attack classification 375) associated with any of these computing machines or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks such as the antenna signal-switching network 310, the raw digital signal-switching network 320, and the signal feature vector network 330. It should be appreciated that the antenna signal-switching network 310, the raw digital signal-switching network 320, and the signal feature vector network 330 may be associated with or share resources with the network 150. These networks may include any type of data or communication links or networks including any of the network technology discussed with respect to FIG. 8.

Figure 4:
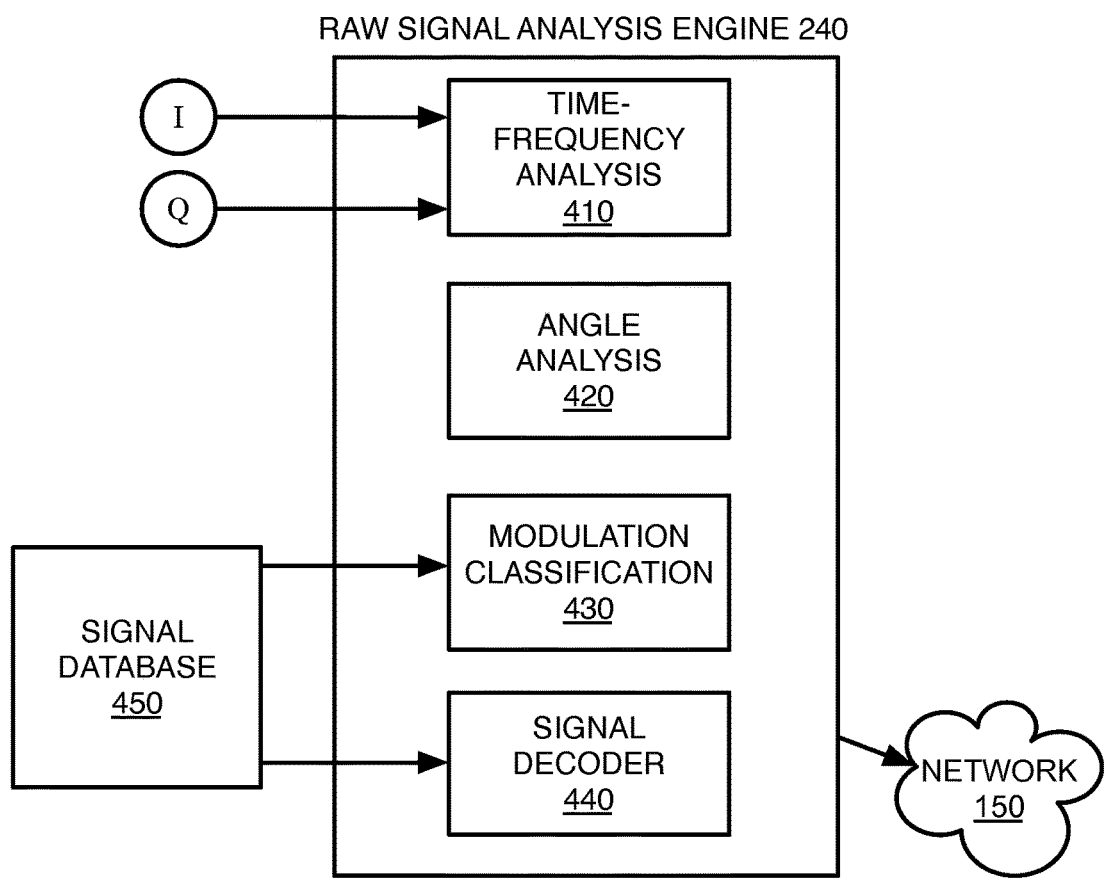
FIG. 4 is a block diagram depicting a raw signal analysis engine in accordance with one or more embodiments presented herein.

FIG. 4 is a block diagram depicting a raw signal analysis engine 240 in accordance with one or more embodiments presented herein. The raw signal analysis engine 240 may receive digital I and Q signal samples for processing. Processing modules of the raw signal analysis engine 240 may include, among other examples, time-frequency analysis 410, angle analysis 420, modulation classification 430, and signal decoding 440. The processing modules, particularly the modulation classification module 430, and the signal decoding module 440, may leverage a signal database 450. Outputs from the raw signal analysis engine 240 may be communicated onto the network 150.

Once received by the raw signal analysis engine 240, the digital I and Q signal samples may be processed and refined to a discrete set of feature vectors. It should be understood that the feature vectors may be processed and re-processed by the various modules associated with the raw signal analysis engine 240 any number of times before being transmitted to the other modules of the signal analysis system 130.

The time-frequency analysis module 410 can generate a set of frequency-domain data vectors for each radio frequency signal 215. The spectrum intensity for each time-frequency bin associated with the frequency-domain data vectors may be encoded as dimensions of feature vectors for each of the radio frequency signals 215.

The time-frequency analysis module 410 can perform a moving window process where N time samples are selected to be processed. The value of N may be adjusted to optimize performance. A fast Fourier transform (FFT) may be computed for the N samples of the window. The FFT output may represent the spectral energy content of the window. The FFT of a vector of samples x may be defined by the matrix-vector product $y = Qx$, where the $(i,k)$ element of $Q$ is $\exp(-2*pi*i*k*j/N)$ and j is the square root of negative one. As new samples of the input signal arrive, the moving window may slide by K samples to a new set of N samples. The value of K may be optimized to maximize the system performance. According to one example, such optimization may be accomplished with a Monte Carlo approach where various values of N and K are tested on a reference signal set and the values of N and K that maximizes a system performance objective function may be selected for used. The system performance objective function may be an aggregation of performance various metrics. These metrics may include, among other examples, signal detection accuracy, modulation classification accuracy, malicious/benign classification accuracy, attack classification accuracy, or processing speed. The output of the FFT may be a sequence of P frequency-domain data vectors $y_p$. The collection of these data vectors can be plotted to show the time-frequency energy in the RF environment. This plot is commonly referred to as a spectrogram.

The time-frequency analysis module 410 can perform energy clustering and association. The frequency-domain data vectors from the FFT may be evaluated for each radio frequency signal 215 received at each respective antenna 210. Each radio frequency signal 215 may contain multiple signals received at the associated antenna 210. Energy clustering and association can perform a clustering analysis on each set of frequency-domain data vectors to determine discrete contiguous blocks of signal that are likely to have been transmitted from the same device. Clustering algorithms such as k-nearest neighbors (KNN), hierarchical clustering, expectation maximization, or any others may be used to perform the clustering. Spectrum feature extraction may be performed on each cluster. Spectrum feature extraction can analyze the clusters to extract a set of signal features including, but not limited to, duration, bandwidth, center frequency, duty cycle, and average power.

As an example of cluster analysis, each cluster can be considered a set of points in the multi-dimensional feature space. The objective of the cluster analysis can be to determine the representative characteristics of the signal that corresponds to each cluster. Accordingly, statistical measures such as the mean, median, or mode of each dimension may be calculated and then taken to represent the signal as that feature dimension. Each cluster can make up a discrete instance of a feature vector. Each feature vector includes one or more of the feature values that implicitly characterize the signals in the environment. Feature vectors created by the time-frequency analysis module 410 may be the inputs to the angle analysis module 420.

It should be appreciated that spectrum feature extraction performed by the time-frequency analysis module 410 may be a similar operation as the feature extraction performed by the space-time-frequency analysis module 350. However, the space-time-frequency analysis module 350 may be configured to cull the disparate refined feature vectors from multiple radio frequency signal 215 (from multiple antennas 210) where the multidimensional cluster of points in feature space may be statistically analyzed to extract a representative value in each feature vector. According to various embodiments, the space-time-frequency analysis module 350 preforms an analysis similar to the time-frequency analysis module 410, but does so with multiple refined feature vectors.

The angle analysis module 420 can add an angle dimension to each feature vector. The result is a feature space that also includes an angle dimension since the feature vector is amended to include an angle estimate. The angle analysis module 420 can sweep through a range of antenna phases. Various phase combinations of the antennas 210 may be used in order to discriminate the source of an emission by an angle relative to the antennas 210. For example, a complex-valued sample may be taken from the frequency-domain data vectors of each of L antennas 120. A vector z may be formed of these samples. A linear combination of the elements of z may be defined by multiplying by a point vector w(a) that is a function of the angle of interest, a. The resulting vector product w(a) z is a scalar value that indicates the intensity of the time-frequency energy in the angle direction a. According to particular embodiments, by sweeping through a range of a values, the angle analysis module 420 can determine an energy over a space-time-frequency (STF) data cube. Angle interference suppression may be performed on the STF data cube to filter out irrelevant RF signals. The angle analysis module 420 can then perform angle clustering and association on the filtered data cube. Angle clustering and association can refine the feature vector based on the angle information. The resulting updated set of feature vectors may be referred to as angle feature vectors. Each angle feature vector can include characteristics about each signal, such as duration, bandwidth, center frequency, duty cycle, average power, and angle.

The modulation classification module 430 can compare the angle feature vectors to features of a library of known signals. The known signals may be retrieved from the signal database 450. The modulation classification module 430 can perform classifications by matching an angle feature vector to a feature vector of a known signal. The matching may seek to minimize a distance metric within a multidimensional feature space. Various alternative distance metrics may be used including, among multiple other examples, Euclidean distance, weighted-sum distance, min-max distance, and so forth. The choice of distance metric may be a parameter of the system this can be optimized to maximize performance. Outputs from the modulation classification module 430 may be angle feature vectors that also include modulation types. These may be referred to as modulation feature vectors.

The signal decoder module 440 can decode messaging layer content from modulation feature vectors. Generally, decoding payload data from the wireless devices 110 may be avoided to protect private personal information. Instead, the signal decoder module 440 may decode unencrypted control information such as handshaking messages (for example, FIN, ACK, FIN ACK, and so forth). The signal decoder module 440 may decode handshaking messages to identify devices using common medium access signals like the MAC address of a device. Upon examining a modulation feature vector, the signal decoder module 440 may retrieve appropriate codecs and drivers from the signal database 450 for decoding the signal. Outputs from the signal decoder module 440 may include additional features to be appended to the received modulation feature vectors. The additional features may include decoded content represented, for example, as a binary sequence or other symbols.

The signal database 450 may provide a library of known signals to the raw signal analysis engines 240. According to certain embodiments, a feature vector of a known signal may be matched against or correlated to a received feature vector to classify modulation types and other parameters associated with the received signal. The signal database 450 may also provide codecs and drivers to the raw signal analysis engines 240. The codecs and drivers may be used for decoding content of the received signal once its modulation type has been classified. It should be appreciated that the signal database 450 may be provided as one of the analysis databases 380.

Outputs from the raw signal analysis engines 240 may comprise a set or stream of refined feature vectors. These feature vectors may have been refined from the received digital I and Q signal samples though one or more iterations of processing by the various modules associated with the raw signal analysis engine 240. The outputs from the raw signal analysis engine 240 may be communicated onto the network 150 to be further processed through the other modules of the signal analysis system 130. The network 150 may comprise one or both of the raw digital signal-switching network 320 and the signal feature vector network 330.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 5:
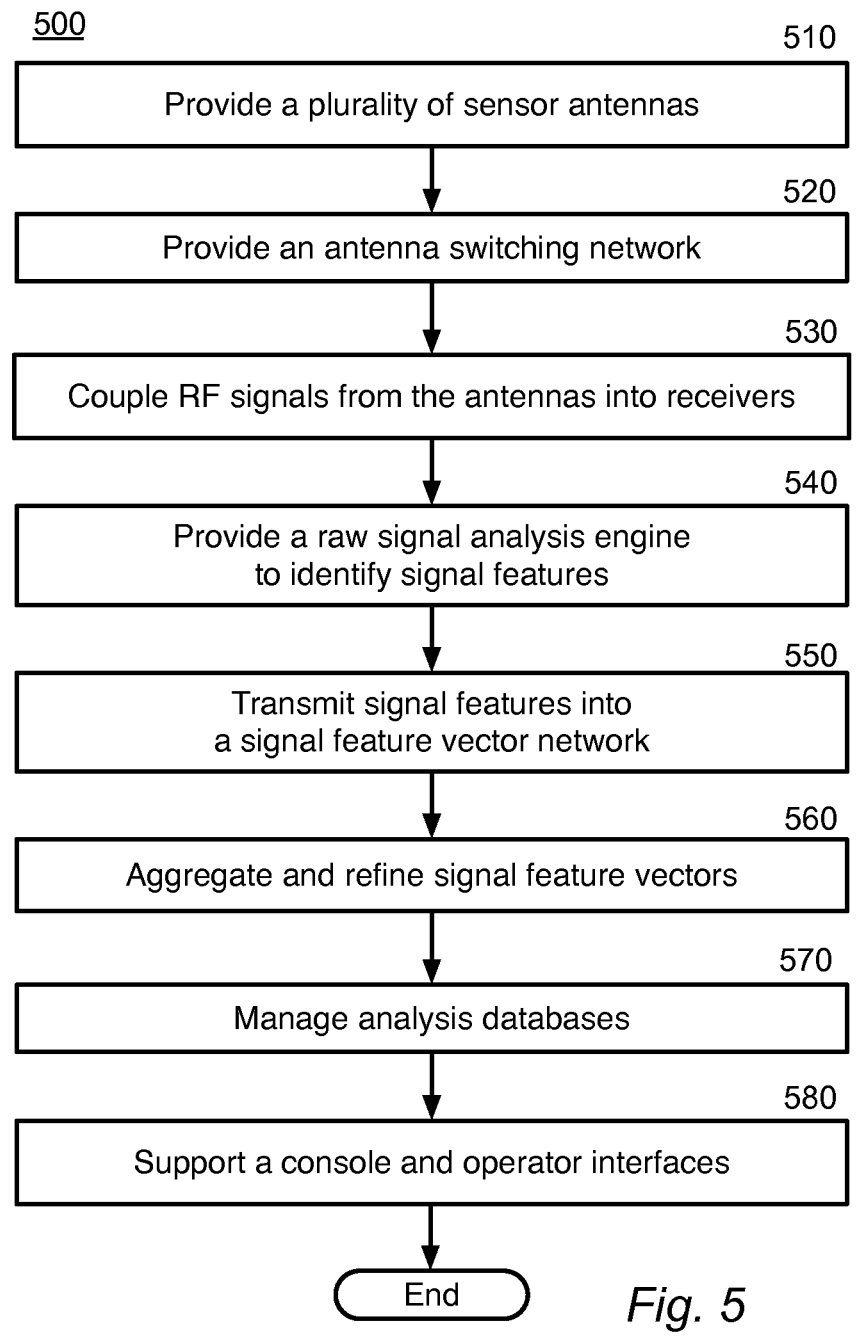
FIG. 5 is a block flow diagram depicting a method for electromagnetic signature analysis and threat detection in accordance with one or more embodiments presented herein.

FIG. 5 is a block flow diagram depicting a method 500 for electromagnetic signature analysis and threat detection in accordance with one or more embodiments presented herein. In block 510, a plurality of antennas 210 associated with sensors 120 may be provided. The antennas 210 may be used to collect a broad range of radio frequency signals from the electromagnetic environment for analysis. The antennas 210 may be monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 210 can be located in various locations around a room, around a building, or within different areas or floors of a building In block 520, an antenna signal-switching network 310 can support switching and routing radio frequency signals 215 received by the antennas 210 to various radio receivers. The radio frequency signals 215 may be coupled from the antennas 210 using coaxial cable, other conductive transmission, or optical fiber waveguides. The antenna signal-switching network 310 can support switching and routing the radio frequency signals 215 from one particular antenna 210 between some or all of the receivers within the system. According to some embodiments, certain receivers may be directly coupled to certain antennas 210 without being switchable.

In block 530, the radio frequency signals 215 received by the antennas 210 may be coupled from the antenna signal-switching network 310 to radio receivers. The receivers may include both the software-defined radios 335 as well as the hardware-defined radios 340.

In block 540, a raw signal analysis engine 240 can process a digital representation of the raw collected radio frequency signal 215. The raw signal analysis engine 240 may receive digital I and Q signal samples. The received samples may be processed and refined to a discrete set of feature vectors. A signal feature vector may be a set of values representing attributes of the signal. Feature vectors may be passed from one stage of analysis or processing to another. At each step, attributes may be added or subtracted from the feature vector further refining the attributes of the particular signal. Such refinement of the feature vector may support identifying, classifying, or otherwise interpreting the content of the signal. Various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth. The raw signal analysis engine 240 may generate a raw signal analysis output 250. The raw signal analysis output 250 may be a condensed collection of intelligible features and data as identified within the collected radio frequency signal 215. According to one or more embodiments, the signal data may be processed and refined into feature vectors that define various attributes of the signal.

It should be appreciated that a hardware-defined radio receiver 340 may incorporate some or all of the features of the raw signal analysis engine 240. Outputs form the hardware-defined radio receiver 340 may be quite specific to the types of wireless communications handled by the hardware-defined radio receiver 340. For example, a hardware-defined radio receiver 340 intended to receive Wi-Fi may output data packets instead of feature vectors. The contents of the data packets may be reformatted into feature vectors along with any addition information provided by the hardware-defined radio receiver 340 such as signal strength or wireless local area network configuration parameters such as channel number, frequency, network identifiers, or so forth.

Figure 6:
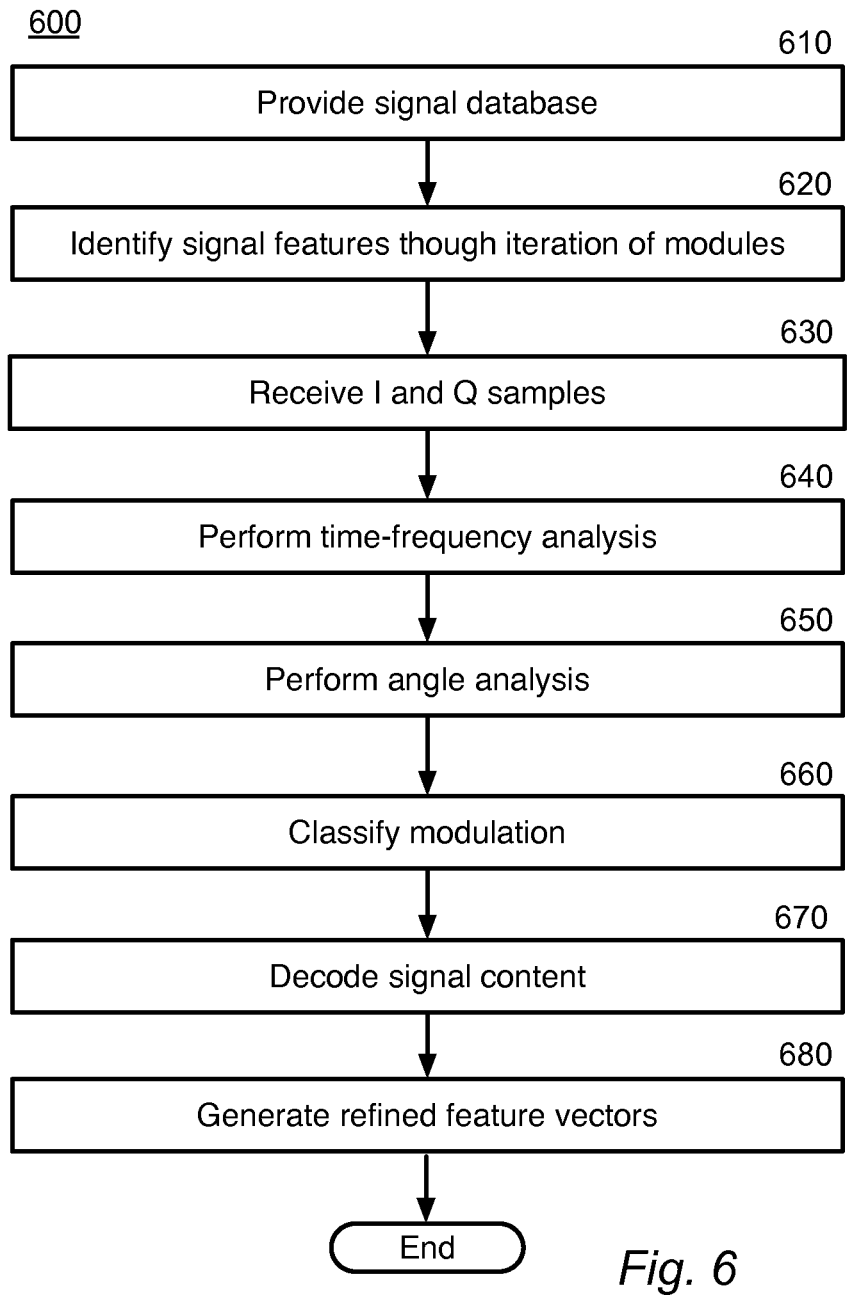
FIG. 6 is a block flow diagram depicting a method for raw signal analysis in accordance with one or more embodiments presented herein.

Additional information regarding operation of the raw signal analysis engine 240 is discussed with respect to FIG. 6.

In block 550, signal features identified by the raw signal analysis engine 240 may be transmitted into a signal feature vector network 330. The signal feature vector network 330 can switch and route signal feature vectors between the raw signal analysis engines 240 and the various other modules associated with the signal analysis system 130.

In block 560, the signal analysis system 130 can aggregate and process the various radio frequency signals 215 captured form the electromagnetic environment by the sensors 120. Example modules of the signal analysis system 130 may include space-time-frequency analysis 350, geolocation 355, pair-wise link association 360, data throughput estimation 365, device classification 370, and attack classification 375. Additional information regarding operation of the signal analysis system 130 is discussed with respect to FIG. 7.

In block 570, analysis databases 380 may be managed. The analysis databases 380 may include, among various other examples, signal databases, sensor position databases, calibration databases, signal signature databases, and attack databases. One or more of the signal processing and threat analysis stages of the signal analysis system 130, including the raw signal analysis engines 240, may leverage the analysis databases 380. The analysis databases 380 may contain various forms of information useful in analyzing the radio frequency signals collected by the sensors 120. Information within the analysis databases 380 may be updated autonomously through automated learning, tuning, or adaptation. Portions of the information within the analysis databases 380 may be updated from time to time from a central provider, from backups, or from other installations. Managing the analysis databases 380 may include sharing locally updated information to other locations or to a central provider. Managing the analysis databases 380 may also include locally updating information received from other locations or from the central provider.

In block 580, a console 140 and various operator interfaces can support configuring, controlling, or reviewing analysis results associated with the signal analysis system 130. The console 140 can provide visualization features for use by security administrators to monitor the electromagnetic environment for wireless security threats. Such visualization features may include displays about the area under surveillance including device type, device locations, pairwise wireless communication links between devices, estimates of the data throughput being transmitted by devices, attack types being perpetrated, malicious devices, victim devices, and so forth. The console 140 may be a desktop computing machine or any other type of computing machine. The operator interfaces may support tablets, mobile devices, web or browser-based applications, alarm system interfaces, and the generation of various reports to system administrators or security personnel.

FIG. 6 is a block flow diagram depicting a method 600 for raw signal analysis in accordance with one or more embodiments presented herein. In block 610, a signal database 450 may be provided. The signal database 450 may provide a library of known signals to the raw signal analysis engines 240. A feature vector of a known signal may be matched against or correlated to a received feature vector to classify modulation types and other parameters associated with the received signal. The signal database 450 may also provide codecs and drivers to the raw signal analysis engines 240. The codecs and drivers may be used for decoding content of the received signal once its modulation type has been classified.

In block 620, signal features may be identified though iterated processing by the various modules associated with the raw signal analysis engine 240. Digital signal samples received by the raw signal analysis engine 240 may be processed and refined to a discrete set of feature vectors. A signal feature vector may be a set of values representing attributes of the signal. Feature vectors may be passed from one stage of analysis or processing to another. At each step, attributes may be added or subtracted from the feature vector further refining the attributes of the particular signal. Such refinement of the feature vector may support identifying, classifying, or otherwise interpreting the content of the signal. During this hierarchical and/or iterative interpretation of the signal various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth. It should be understood that the feature vectors may be processed and re-processed by the various modules associated with the raw signal analysis engine 240 any number of times before being transmitted to the other modules of the signal analysis system 130.

In block 630, the raw signal analysis engine 240 may receive digital I and Q signal samples. The digitizers 230 may generate the samples from the signals collected at the antennas 210.

In block 640, the time-frequency analysis module 410 can generate a set of frequency-domain data vectors for each radio frequency signal 215. The spectrum intensity for each time-frequency bin associated with the frequency-domain data vectors may be encoded as dimensions of feature vectors for each of the radio frequency signals 215. The time-frequency analysis module 410 can perform a fast Fourier transform (FFT) over a finite sample window. The FFT output may represent the spectral energy content of the window. The output of the FFT may be a sequence of frequency-domain data vectors. The collection of these data vectors can be plotted to show the time-frequency energy in the RF environment. This plot is commonly referred to as a spectrogram.

The time-frequency analysis module 410 can perform energy clustering and association. Energy clustering and association can perform a clustering analysis on each set of frequency-domain data vectors to determine discrete contiguous blocks of signal that are likely to have been transmitted from the same device. Spectrum feature extraction may be performed on each cluster. Spectrum feature extraction can analyze the clusters to extract a set of signal features including, but not limited to, duration, bandwidth, center frequency, duty cycle, and average power.

In block 650, the angle analysis module 420 can sweep through a range of antenna phases. Various phase combinations of the antennas 210 may be used in order to discriminate the source of an emission by an angle relative to the antennas 210. By sweeping through a range of values, the angle analysis module 420 can determine energies over a space-time-frequency (STF) data cube. Angle interference suppression may be performed on the STF data cube to filter out irrelevant RF signals. The angle analysis module 420 can then perform angle clustering and association on the filtered data cube. Angle clustering and association can refine the feature vector based on the angle information. The resulting updated set of feature vectors may be referred to as angle feature vectors. Each angle feature vector can include characteristics about each signal, such as duration, bandwidth, center frequency, duty cycle, average power, and angle.

In block 660, the modulation classification module 430 classify modulation types by comparing the angle feature vectors to features of a library of known signals. The known signals may be retrieved from the signal database 450. The modulation classification module 430 can perform classifications by matching an angle feature vector to a feature vector of a known signal. Outputs from the modulation classification module 430 may be angle feature vectors that also include modulation types. These may be referred to as modulation feature vectors.

In block 670, the signal decoder module 440 can decode messaging layer content from modulation feature vectors. Upon examining a modulation feature vector, the signal decoder module 440 may retrieve appropriate codecs and drivers from the signal database 450 for decoding the signal. The signal decoder module 440 may decode handshaking messages to identify devices using common medium access signals like the MAC address of a device. Outputs from the signal decoder module 440 may include additional features to be appended to the received modulation feature vectors. The additional features may include decoded content represented, for example, as a binary sequence or other symbols.

In block 680, refined feature vectors may be generated. Outputs from the raw signal analysis engines 240 may comprise a set or stream of refined feature vectors. The outputs from the raw signal analysis engine 240 may be communicated onto the network 150 to be further processed through the other modules of the signal analysis system 130.

Figure 7:
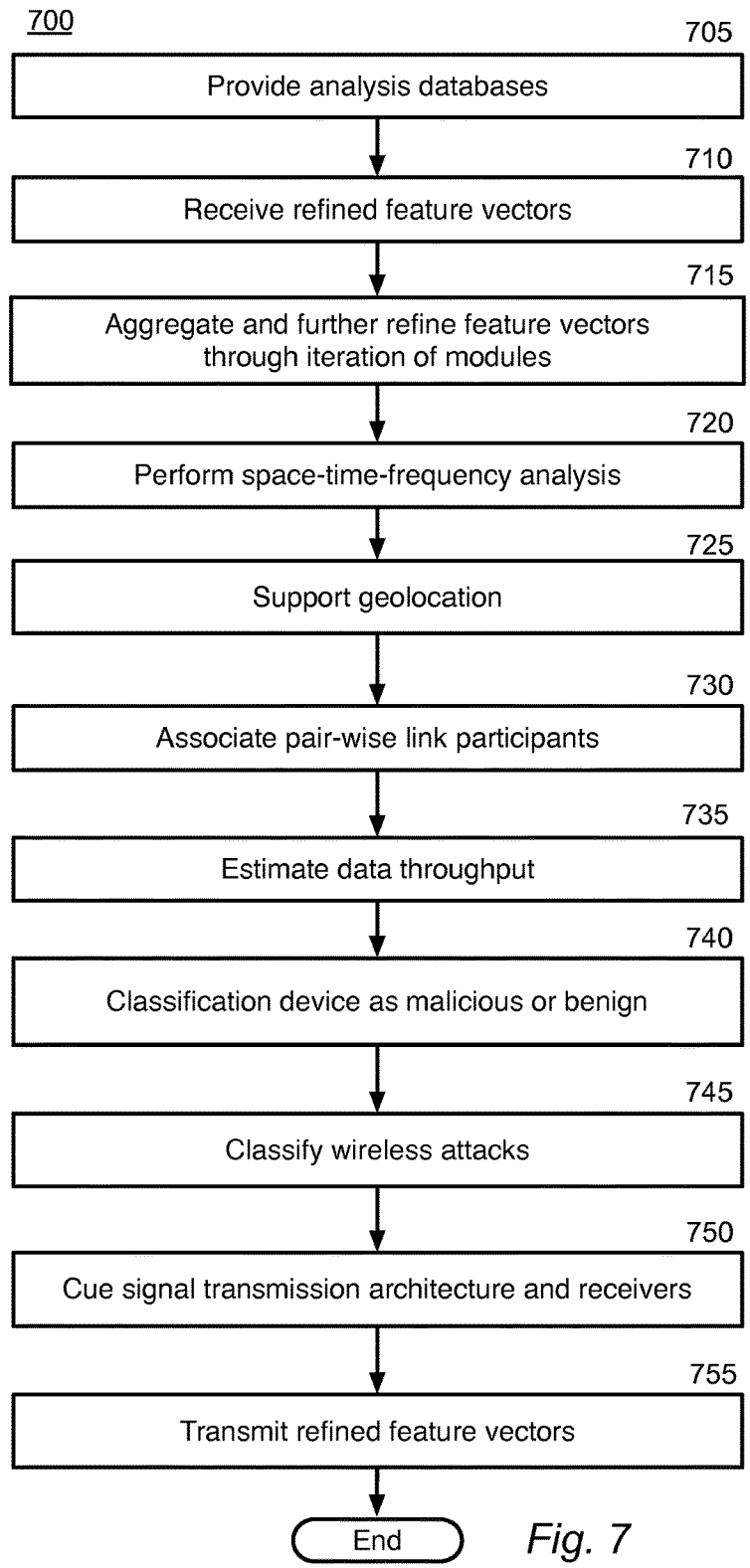
FIG. 7 is a block flow diagram depicting a method for feature vector aggregation and analysis in accordance with one or more embodiments presented herein.

FIG. 7 is a block flow diagram depicting a method 700 for feature vector aggregation and analysis in accordance with one or more embodiments presented herein. In block 705, analysis databases 380 may be provided. The analysis databases 380 may include, among various other examples, signal databases, sensor position databases, calibration databases, signal signature databases, and attack databases. One or more of the signal processing and threat analysis stages of the signal analysis system 130 may leverage the analysis databases 380. The analysis databases 380 may contain various forms of information useful in analyzing the radio frequency signals collected by the sensors 120.

In block 710, the signal analysis system 130 can receive refined feature vectors. The refined feature vectors may be used in detecting, classifying, and mitigating wireless attacks against one or more wireless devices 110. Various digital signal processing stages may be applied to the receive refined feature vectors. These digital signal processing stages may comprise modules of the signal analysis system 130. Generally, a signal feature vector may be a set of values representing attributes of a particular signal.

In block 715, the signal analysis system 130 can aggregate and further refine feature vectors through the iteration of various processing modules. Example modules of the signal analysis system 130 may include space-time-frequency analysis 350, geolocation 355, pair-wise link association 360, data throughput estimation 365, device classification 370, and attack classification 375. As a feature vector is passed from one processing module or stage to the next, attributes may be added or subtracted from the feature vector, further refining the attributes of the particular signal to better identify and/or classify the contents of the signal. Feature vectors may be appended with various feature attributes relevant to the processing at each module or processing stage.

In block 720, the space-time-frequency analysis module 350 can process refined feature vectors to match them to a common reference frame. The space-time-frequency analysis module 350 can also resolve redundant signal detection when the same signal is detected at more than one sensor 120. The space-time-frequency analysis module 350 can perform signal clustering and association. Feature vectors from multiple sensors 120 may be clustered into common groups. The space-time-frequency analysis module 350 can perform feature extraction. Feature extraction can cull disparate refined feature vectors from multiple sensors 120 into an aggregate feature vector that seeks to represent the information about wireless devices 110 in the environment with minimal, or significantly reduced, redundancy. Certain dimensions of aggregated feature vectors may provide identical values across multiple sensors 120. These may include duration, bandwidth, center frequency, and duty cycle, among others. Certain other dimensions of aggregated feature vectors may be maintained as a list of potentially disparate values, with each value corresponding to a single sensor 120. For instance, the dimensions of the aggregate feature vectors representing a power and an angle of a signal may vary across sensors 120 due to the sensors being in different locations.

In block 725, the geolocation module 355 analyzes received signals to locate the position of wireless devices 110 within the electromagnetic environment. Geolocating signals in an environment that is dense with other signals and contains complex propagation effects like multipath and Doppler shift can present several challenges. To aid in estimate the position of each signal, propagation modeling may leverage a database of sensor positions and various parameters associated with the propagation environment. The geolocation module 355 can carry out propagation modeling using the calibration parameters along with information on signal power and angle values, and a coordinate system of locations for the sensors 120. These quantities may be used to calculate a forward model of the expected power and angle values for sample points in space. These model values may be used to create an initial geolocation estimate using multilateration techniques. The initial geolocation estimate may be used to seed a model-matching filter.

The model-matching filter can evaluate multiple aggregated feature vectors in series. For each aggregate feature vector, the model-matching filter may initialize an ensemble of hypothesized signal source positions around the initial seed position. In an iterative process using the model values, a converging estimate of the aggregate feature vector position may be generated for each wireless device 110 being located. As part of each iteration, hypothesized positions that do not fit the model may be removed. After a sufficient number of iterations, the position estimate for the aggregate feature vector may converge to a single point. This approach may be repeated for all aggregate feature vectors.

In block 730, the pair-wise link association module 360 may determine a link pair of wireless devices 110. Generally a signal emanates from a source wireless device 110 and is intended for one or more destination wireless devices 110. The emitting device and a receiving device may constitute a link pair. Information about link pairings may be useful in inferring the behavior and intent of wireless devices 110 within a network. Modulation association may be implemented within the pair-wise link association module 360. Generally, wireless devices 110 within a wireless network participate in pair-wise links between devices engaged in common or corresponding wireless features such as modulation, position, space-time-frequency occupancy, and so forth. Pair-wise links may also be determined by examining decoded message contents. Feature vectors successfully evaluated by the pair-wise link association module 360 may be appended with a new set of feature vectors that contain the pairwise link information. It should be appreciated that these techniques used to associate pairs of communicating wireless devices 110 may also apply to groups of three or more wireless devices 110 that are in communication with one another.

In block 735, the data throughput estimation module 365 can estimate an amount of data in each pairwise feature vector. Even when signal content data is not directly decoded, its spectral occupancy may serve as a proxy for the amount of data that is being passed through each link wireless devices 110 associated with each pairwise feature vector. This estimation may occur on two levels. The first level, spectrogram analysis, can use Shannon's capacity formula to bound the maximum amount of data transfer. The second level, modulation and link analysis, can leverage a signal signature database containing data throughput values for various known signal modulation schemes. By pairing the modulation feature values included in the pair-wise feature vector with the signal signature database entries, modulation and link analysis can provide a reasonably accurate estimate of the data throughput. An estimate of the data throughput for each signal may be added to each corresponding pair-wise feature vector.

In block 740, the device classification module 370 can classify wireless devices 110 as being either benign or malicious (also referred to as unauthorized or rogue). Devices classification can function to identify each pairwise feature vector as either benign or malicious. The device classification module 370 can perform signature matching, which attempts to match the signal and link features of each data throughput feature vector to known examples of benign and malicious devices in the signal signature database. The device classification module 370 can further perform anomaly analysis, which compares the features associated with each data throughput feature vector into an aggregate metric. If the aggregate metric exceeds one or more established anomaly thresholds, the associated wireless device 110 may be flagged as malicious or potentially malicious.

The device classification module 370 can also perform location analysis or geo-fencing, which evaluates the geo-location features associated with each feature vector. If an unauthorized wireless device 110 is identified to be within in a restricted area, then the wireless device 110 may be flagged as malicious or potentially malicious.

In block 745, the attack classification module 375 can determine the type of attack being perpetrated by a malicious wireless device 110. The attack classification module 375 can also determine if multiple malicious wireless devices 110 are involved in the attack and which victim wireless devices 110 are being attacked. The attack classification module 375 can support attack matching, which can use a library of attack templates to match malicious wireless device 110 activities to known attacks such as spoofing, DoS, jamming, wormholes, and others discussed herein or known in the art.

In block 750, the signal analysis system 130 can cue resources associated with the signal transmission and processing architecture. Processing of the various received signals can cue configurations of the antenna signal-switching network 310. The antenna signal-switching network 310 can support switching and routing radio frequency signals 215 received by the antennas 210 to various radio receivers. The radio receivers may include both the software-defined radios 335 as well as the hardware-defined radios 340. One example of cueing configurations of the antenna signal-switching network 310 may involve rerouting a received radio frequency signal 215 between a software-defined receiver 335 and a hardware-defined receiver 340 based upon which receiver type benefits overall system efficacy or efficient resource allocation. Similarly the antenna signal-switching network 310 may be cued to split the radio frequency signal 215 to both a software-defined receiver 335 and a hardware-defined receiver 340 to allow the hardware-defined receiver 340 to efficient extract and decode signal components specific to that receiver while the signal analysis system 130 focuses on other components of that radio frequency signal 215 requiring specialized processing or multi-signal aggregation.

In block 755, the signal analysis system 130 can output feature vectors that have been refined through the iteration of various processing modules. The signal feature vectors may be transported within the signal feature vector network 330 to the console 140 or various other applications.

Example Systems

FIG. 8 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for a sensor mesh and signal transmission architecture for electromagnetic signature analysis and threat detection, comprising:
    providing a plurality of sensor antennas within an electromagnetic environment, wherein the electromagnetic environment supports operation of a plurality of wireless devices;
    coupling radio frequency signals from the plurality of sensor antennas into an antenna feed network operable to switch and route the radio frequency signals between the plurality of sensor antennas and a plurality of radio receivers through the sensor mesh;
    coupling radio frequency signals from the antenna feed network into the plurality of radio receivers;
    performing raw signal analysis within the plurality of radio receivers to identify signal features;
    forming signal feature vectors, within the plurality of radio receivers, each of the signal feature vectors comprising two or more of the identified signal features;
    transmitting the signal feature vectors from the plurality of radio receivers into a signal feature network operable to switch and route the signal feature vectors between the plurality of radio receivers and one or more feature vector processors;
    aggregating, within one of the feature vector processors, the signal feature vectors from two or more of the plurality of radio receivers in response to the signal feature vectors being identified as the same simultaneous emission from one of the plurality of wireless devices;
    processing the signal feature vectors, within one or more of the feature vector processors, to refine the signal features within the signal feature vectors;
    classifying one of the plurality of wireless devices as malicious or benign according to the refined signal features within the signal feature vectors;
    identifying wireless attacks according to the signal features within the signal feature vectors;
    reconfiguring the antenna feed network according to the signal features within the signal feature vectors; and
    transmitting the refined signal feature vectors from the one or more feature vector processors to support operator interfaces.

2. The method of claim 1, wherein the antenna feed network comprises direct connections between the sensor antennas and the one or more radio receivers.

3. The method of claim 1, wherein the antenna feed network comprises radio frequency signal switches.

4. The method of claim 1, wherein the antenna feed network comprises radio frequency signal splitters.

5. The method of claim 1, wherein the one or more radio receivers comprises a software-defined radio.

6. The method of claim 1, wherein the plurality of radio receivers comprises a hardware-defined radio.

7. The method of claim 1, wherein reconfiguring the antenna feed network comprises switching one of the radio frequency signals between a software-defined radio and a hardware-defined radio.

8. The method of claim 1, wherein identifying signal features comprises decoding signal content.

9. The method of claim 1, wherein one of the signal features comprises one of a duration, a bandwidth, a center frequency, a duty cycle, and an average power.

10. The method of claim 1, wherein the signal feature network comprises a packetized data network.

11. The method of claim 1, further comprising retrieving information from one or more analysis databases.

12. The method of claim 1, wherein the operator interfaces comprise an administrative user interface application.

13. A sensor mesh and signal transmission system for electromagnetic signature analysis and threat detection, comprising:
    a plurality of sensor antennas deployed as a sensor mesh within an electromagnetic environment, wherein the electromagnetic environment supports operation of a plurality of wireless devices;
    an antenna feed network configured to couple radio frequency signals from the plurality of sensor antennas to a plurality of radio receivers through the sensor mesh;
    a raw signal analysis engine associated with the plurality of radio receivers, the raw signal analysis engine comprising one or more processing units, and one or more processing modules configuring the one or more processing units to identify signal features within the radio frequency signals, form signal feature vectors from two or more of the identified signal features, and transmit the signal feature vectors;
    a signal feature network configured to receive signal feature vectors transmitted from the raw signal analysis engine; and
    a signal aggregation and analysis engine comprising one or more processing units, and one or more processing modules configuring the one or more processing units to:
    aggregate two or more of the signal feature vectors from the signal feature network in response to the signal feature vectors being identified as the same simultaneous emission from one of the plurality of wireless devices;
    process the signal feature vectors to refine the signal features within the signal feature vectors;
    identify wireless attacks from one of the plurality of wireless devices according to the signal features within the signal feature vectors; and reconfigure the antenna feed network according to the signal features within the signal feature vectors.

14. The system of claim 13, wherein the signal aggregation and analysis engine is further configured to present information associated with the refined signal feature vectors to support an operator interface.

15. The system of claim 13, wherein the antenna feed network comprises one of a direct radio frequency interconnection, a radio frequency signal switch, and a radio frequency signal splitter.

16. The system of claim 13, wherein the plurality of radio receivers comprises one of a software-defined radio and a hardware-defined radio.

17. The system of claim 13, wherein one of the signal features comprises one of a duration, a bandwidth, a center frequency, a duty cycle, and an average power.

18. The system of claim 13, wherein the signal feature network comprises a packetized data network.

19. The system of claim 13, further comprising one or more analysis databases.

20. A sensor mesh and signal transmission system for electromagnetic signature analysis and threat detection, comprising:
- a plurality of sensor antennas deployed as a sensor mesh within an electromagnetic environment wherein the electromagnetic environment supports operation of a plurality of wireless devices;
- a configurable antenna feed network operable to couple radio frequency signals from one or more of the sensor antennas through the sensor mesh to a software-defined radio receiver and from one or more of the sensor antennas to a hardware-defined radio receiver;
- a raw signal analysis engine associated with the software-defined radio receiver, the raw signal analysis engine operable to receive digital samples of one of the radio frequency signals, identify signal features within the digital samples, form signal feature vectors from two or more of the identified signal features, and transmit the signal feature vectors;
- a signal feature network configured to receive the signal feature vectors from the raw signal analysis engine; and
- a signal aggregation and analysis engine operable to receive the signal feature vectors from the signal feature network, aggregate two or more of the signal feature vectors in response to the signal feature vectors being identified as the same simultaneous emission from one of the plurality of wireless devices, process the signal feature vectors to refine the signal features within the signal feature vectors, and identify wireless attacks from one of the plurality of wireless devices according to the signal features within the signal feature vectors; and
- one or more updatable analysis databases supporting operations of the raw signal analysis engine and the signal aggregation and analysis engine.

* * * * *